US009470899B2

(12) United States Patent
Yoneno et al.

(10) Patent No.: US 9,470,899 B2
(45) Date of Patent: Oct. 18, 2016

(54) DISPLAY APPARATUS

(71) Applicant: SEIKO EPSON CORPORATION, Tokyo (JP)

(72) Inventors: Kunio Yoneno, Shiojiri (JP); Takashi Endo, Azumino (JP); Tomio Sonehara, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 4 days.

(21) Appl. No.: 14/724,290

(22) Filed: May 28, 2015

(65) Prior Publication Data
US 2015/0362742 A1 Dec. 17, 2015

(30) Foreign Application Priority Data

Jun. 11, 2014 (JP) ................................. 2014-120286

(51) Int. Cl.
*G02B 27/22* (2006.01)
*G03B 21/20* (2006.01)
*H04N 9/31* (2006.01)

(52) U.S. Cl.
CPC ......... *G02B 27/2214* (2013.01); *G02B 27/225* (2013.01); *G03B 21/206* (2013.01); *G03B 21/2066* (2013.01); *H04N 9/3147* (2013.01)

(58) Field of Classification Search
CPC .............. H04N 9/3147; G02B 27/225; G02B 27/2214; G02B 27/2221; G02B 27/2228; G02B 27/2235; G02B 27/2242
See application file for complete search history.

(56) References Cited

U.S. PATENT DOCUMENTS

| | | | | |
|---|---|---|---|---|
| 6,999,071 B2 * | 2/2006 | Balogh | .............. | G02B 27/2214 345/419 |
| 7,490,941 B2 * | 2/2009 | Mintz | ................ | G02B 27/2285 349/30 |
| 7,959,294 B2 * | 6/2011 | Balogh | .............. | G02B 27/2214 348/59 |
| 7,993,016 B2 * | 8/2011 | Gao | ..................... | G02B 27/225 348/59 |
| 9,046,758 B2 * | 6/2015 | Liu | ........................ | G02B 5/0252 |
| 2003/0156077 A1 * | 8/2003 | Balogh | .............. | G02B 27/2214 345/6 |
| 2006/0171008 A1 * | 8/2006 | Mintz | ................ | G02B 27/2285 359/15 |
| 2007/0064201 A1 | 3/2007 | Hoshino et al. | | |
| 2008/0204663 A1 * | 8/2008 | Balogh | .............. | G02B 27/2214 353/10 |

(Continued)

FOREIGN PATENT DOCUMENTS

JP 2006-010852 A 1/2006
JP 3955582 B2 8/2007

(Continued)

*Primary Examiner* — Bao-Luan Le
(74) *Attorney, Agent, or Firm* — Oliff PLC

(57) ABSTRACT

A transmissive screen formed in an arc shape around a center axis, and, when light entering an inner circumferential surface is output from an outer circumferential surface, having a diffusion angle in a first direction as a direction along the center axis wider than a diffusion angle in a second direction as a circumferential direction around the center axis, projection devices that are arranged at equal intervals along the second direction around the center axis and respectively project image lights on the inner circumferential surface, and a display control device that allows the projection devices to project the image lights so that partial images formed by portions of the respectively projected image lights of the projection devices may be observed as one visually recognized image having the partial images arranged in the second direction at viewpoints set outside of the outer circumferential surface along the second direction are provided.

7 Claims, 22 Drawing Sheets

(56) References Cited

U.S. PATENT DOCUMENTS

| | | |
|---|---|---|
| 2008/0218854 A1 | 9/2008 | Hoshino et al. |
| 2010/0253915 A1* | 10/2010 | Gao ............... G03B 21/60 353/7 |
| 2010/0253916 A1* | 10/2010 | Gao ............... G02B 27/225 353/7 |
| 2010/0253917 A1* | 10/2010 | Gao ............... G02B 27/225 353/7 |
| 2012/0105805 A1* | 5/2012 | Kuo ............... G02B 27/2214 353/7 |
| 2012/0147003 A1* | 6/2012 | Liu ............... G02B 5/0252 345/419 |
| 2012/0200681 A1* | 8/2012 | Yoshida ............... G02B 27/2214 348/55 |
| 2013/0222557 A1* | 8/2013 | Kuo ............... G02B 27/225 348/54 |

FOREIGN PATENT DOCUMENTS

| | | |
|---|---|---|
| JP | 2008-224748 A | 9/2008 |
| JP | 4267668 B2 | 5/2009 |
| JP | 2010-032952 A | 2/2010 |
| JP | 5099554 B2 | 12/2012 |

* cited by examiner

DISPLAY APPARATUS

BACKGROUND

1. Technical Field

The present invention relates to a display apparatus.

2. Related Art

In related art, a display apparatus that includes a cylindrical casing, displays an image in response to a position of an observer moving in the circumferential direction of the casing, and thereby, allows stereoscopic visual recognition of the image using motion parallax has been known (for example, see Patent Document 1 (Japanese Patent No. 3955582).

The display apparatus disclosed in Patent Document 1 includes an electronic projector, a rotation mechanism unit, a screen, a mirror, and a polygonal mirror. In the display apparatus, the electronic projector projects a projected image in which frame images as images of the same object from respectively different positions are arranged in a ring form, and the projected image is folded by the mirror. The respective frame images contained in the folded projected image are allowed to enter the annular polygonal mirror surrounding the screen. The polygonal mirror includes a plurality of groups of mirrors and reflects the respectively entering frame images toward the screen.

The screen is rotated about the center axis of the casing by the rotation mechanism unit, and reflects the respective frame images entering from the respective mirrors forming the polygonal mirror when rotated to the positions opposed to the mirrors. On the screen, a viewing angle limiting filter that limits the viewing angle so that the adjacent frame images may not be seen is provided, and thereby, the observer may see only the frame image in response to the direction of the observation of the screen from the position of the observer. Accordingly, the observer may observe the different frame images in response to the respective positions of viewpoints of observation of the screen while moving along the circumferential direction of the display apparatus and changing the viewpoints, and thereby, may stereoscopically visually recognize objects contained in the images using motion parallax.

However, in the display apparatus disclosed in Patent Document 1, the respective frame images as portions of the projected images from one or more projectors are reflected by the polygonal mirror to enter the screen. Accordingly, the images observed by the observer are only small areas in the projected images of the projector, and there is a problem of lower resolution and blur with the visually recognized images.

SUMMARY

An advantage of some aspects of the invention is to provide a display apparatus that enables clear visual recognition of a stereoscopic image.

A display apparatus according to an aspect of the invention includes a transmissive screen formed in an arc shape forming at least a part of a cylindrical shape around a center axis, and, when light entering an inner circumferential surface is output from an outer circumferential surface, having a diffusion angle in a first direction as a direction along the center axis wider than a diffusion angle in a second direction as a circumferential direction around the center axis, a plurality of projection devices that are respectively arranged at equal intervals along the second direction around the center axis and respectively project image lights on the inner circumferential surface, and a display control device that allows the plurality of projection devices to project the image lights so that partial images formed by portions of the respectively projected image lights of the plurality of projection devices may be visually recognized as one visually recognized image in which the partial images are arranged in the second direction at a plurality of viewpoints set outside of the outer circumferential surface along the second direction.

Note that the screen does not necessarily have the cylindrical shape, and may have a partial arc shape in the circumferential direction (second direction) of the cylindrical shape around the center axis.

According to the aspect, the image lights projected from the plurality of projection devices on the inner circumferential surface of the screen are output to be wider in the first direction along the center axis and narrower in the second direction as the circumferential direction around the center axis when output from the outer circumferential surface of the screen. Accordingly, at one of the plurality of viewpoints set along the second direction outside of the outer circumferential surface, partial images as portions of images formed by the image lights output from the respective projection devices are visually recognized. That is, at the one viewpoint, the image in which the partial images contained in the projected images by the respective projection devices in the different positions of the respectively projected images are arranged along the second direction may be visually recognized. Further, the display control device allows the respective projection devices to project the projected images using the partial images in the positions entering the respective viewpoints as the partial images in response to the viewpoints, and thereby, the visually recognized images different at the respective viewpoints may be visually recognized. In this regard, the display control device allows the respective projection devices to project projected images as images of the same stereoscopic image of an observation object respectively seen from the positions in response to the view points, which form the visually recognized images at the respective viewpoints, and thereby, the observation object contained in the visually recognized images may be stereoscopically visually recognized.

Further, the visually recognized image is an image in which the partial images projected from the respective projection devices are arranged in the second direction, and thus, the resolution of the visually recognized image may be improved compared to the configuration disclosed in Patent Document 1. Therefore, the observation object as the stereoscopic image may be clearly visually recognized.

In the aspect, it is preferable that, when the plurality of projection devices are seen the first direction, respective output parts of the image lights are located inside of the cylindrical shape.

According to the aspect, the output parts of the image lights in the plurality of projection devices are located inside of the cylindrical shape as an extension of the arc-shaped screen, and thereby, the display apparatus may be downsized.

In the aspect, it is preferable that the screen has a direction adjustment layer that adjusts a traveling direction of the light output from the outer circumferential surface when the light entering the inner circumferential surface is output from the outer circumferential surface.

Here, for example, when the plurality of projection device are located at one end side in the first direction with respect to the screen, the respective projection devices project image lights from one end side toward the other end side. In this case, the viewpoint is nearly at the center of the screen in the first direction, in the projection range of the images by the projection devices, the principal beam of the light passing through the one end side is closer to the viewpoint, and the amount of light entering the viewpoint becomes larger. However, in the projection range, the principal beam of the light passing through the other end side is farther from the viewpoint, and the amount of light entering the viewpoint becomes smaller. In this case, the other end side in the visually recognized image visually recognized at the viewpoint is darker than the one end side, and brightness unevenness is caused in the visually recognized image.

On the other hand, in the aspect, the screen has the direction adjustment layer that adjusts the traveling direction of the light output from the outer circumferential surface, and thereby, may adjust the output directions of the image lights from the outer circumferential surface so that the image lights may be output toward the viewpoint side in response to the incident positions of the image lights projected and entering from the projection devices. Therefore, brightness unevenness caused in the visually recognized image may be suppressed.

The same applies to the case where the plurality of projection devices are located at the other end side in the first direction with respect to the screen.

In the aspect, it is preferable that a position detection device that detects a position of an observer is provided, and the display control device allows the projection devices that project the image lights entering the detected position of the observer in the plurality of projection devices to project the image lights.

In the aspect, the display control device allows the projection devices that project the image lights entering the detected position of the observer to project the image lights. That is, the display control device allows the projection devices that project partial images forming the visually recognized image visually recognized in the position of the observer to project the partial images. Thereby, not all of the projection devices are necessarily required to operate the image lights. Therefore, the power consumption of the display apparatus may be reduced.

In the aspect, it is preferable that a distance detection device that detects a distance of an observer from the center axis is provided, and the display control device forms the partial images making the visually recognized image visually recognized in the position of the observer in response to the detected distance of the observer.

Here, the respective projection devices project image lights at predetermined angles of view, and the numbers of the projection devices that project image lights entering the viewpoints and the visually recognized regions of the projected images are different between the closer viewpoint and the farther viewpoint with respect to the screen. Accordingly, when the projected images optimized to the closer viewpoint are visually recognized at the farther viewpoint, the image region that can be visually recognized is narrower and the image as a combination of the projected images of the plurality of projection devices is unnatural.

On the other hand, in the aspect, the display control device changes the partial images forming the visually recognized image visually recognized in the position of the observer in response to the detected distance of the observer. For example, when the observer is located at the farther viewpoint, the display control device allows the respective projection devices to project image lights so that the visually recognized image at the closer viewpoint may be formed and visually recognized by the image lights projected by the projection devices that project image lights entering the farther viewpoint. Thereby, even when the distance of the observer with respect to the center axis (i.e., the distance of the viewpoint) is changed, the observer may visually recognize the visually recognized images containing the same content. Therefore, the vision of the image may be made natural.

In the aspect, it is preferable that, supposing that a number of the plurality of projection devices is n, a diameter of the screen is D, and a diameter of a virtual circle on which respective pupil positions of the plurality of projection devices are located around the center axis is φ, a diffusion angle δ of the screen in the second direction is expressed by formula (1).

$$\delta = 360/n \times 1/(D/4)\phi+1) \tag{1}$$

According to the aspect, the value of the diffusion angle δ derived by the formula (1) is used as the diffusion angle of the light of the screen in the second direction, and thereby, in the visually recognized image visually recognized at the viewpoint, gaps and overlaps between partial images respectively projected from the adjacent projection devices may be suppressed. Therefore, the visually recognized image in which the partial images projected from the respective projection devices are arranged in the second direction may be easily visually recognized as one displayed image.

In the aspect, it is preferable that each of the plurality of projection devices includes a light source unit that respectively and individually outputs three color lights of red, green, and blue in a time-division manner, a light modulator that respectively modulates the three color lights output from the light source unit and forms color images in response to the three color lights, and a projection optical unit that projects the color images in response to the three color lights formed by the light modulator, and the display control device allows the adjacent projection devices of the plurality of projection devices to respectively project the color images in different colors.

According to the aspect, the respective projection devices respectively modulate red light, green light, and blue light respectively individually output from the light source unit in the time-division manner using the light modulators and the projection optical units project color images in response to the respective color lights, and thereby, one image (frame) is displayed. In this regard, as described above, in the respective projection devices arranged along the second direction, when the adjacent projection devices project color images in the same color at the same time, flicker is likely to occur.

On the other hand, according to the aspect, the display control device allows the adjacent projection devices to respectively project color images in different colors, and thereby, occurrence of flicker may be suppressed.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

As below, the first embodiment of the invention will be explained with reference to the drawings.

Outline Configuration of Display Apparatus

Figure 1:
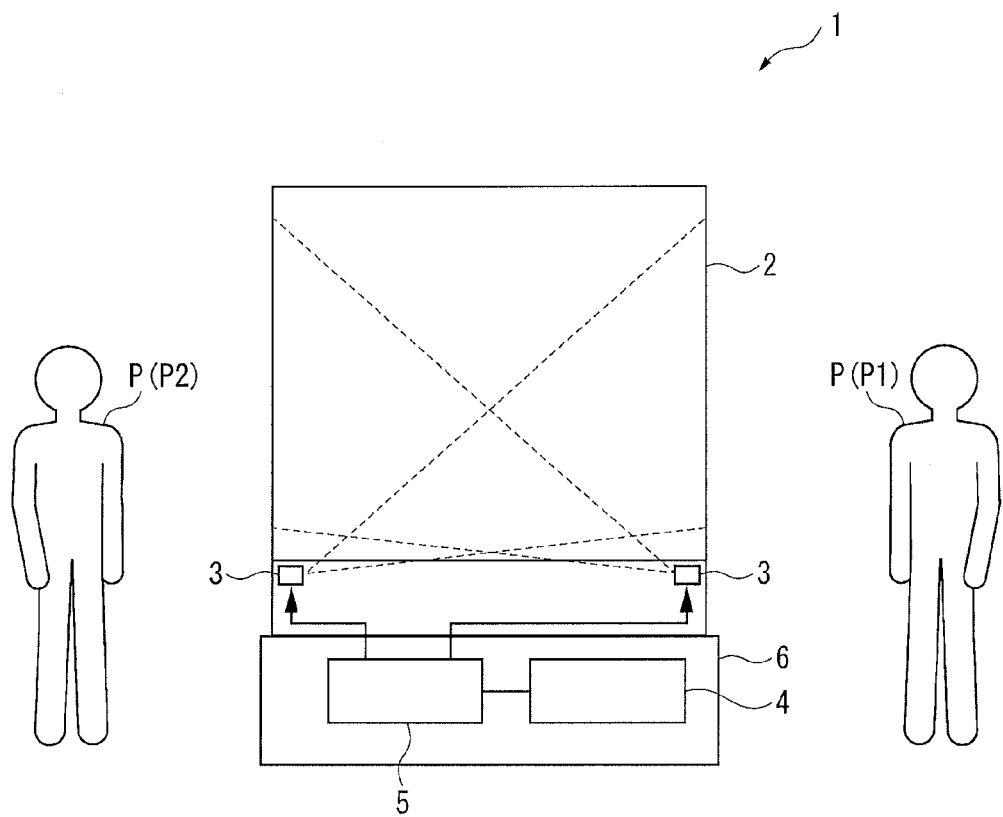
FIG. 1 is a schematic diagram showing a display apparatus according to the first embodiment of the invention.

FIG. 1 is a schematic diagram showing an outline configuration of a display apparatus 1 according to the embodiment as seen from the side.

The display apparatus 1 according to the embodiment enables stereoscopic visual recognition of an observation object as a stereoscopic image contained in a displayed image using motion parallax and binocular parallax, and includes a transmissive screen 2, a plurality of projection devices 3, a storage device 4, a display control device 5, and a pedestal 6 as shown in FIG. 1. Specifically, in the display apparatus 1, the display control device 5 that has read out image data stored in the storage device 4 generates projected images to be projected by the respective projection devices 3, the corresponding projection devices 3 project image lights in response to the generated respective projected images on an inner circumferential surface of the screen 2. Thereby, the image lights are transmitted through the screen 2 and enter eyes of observers (P1, P2), and images in response to the current positions of the observers P are observed.

Of them, the pedestal 6 is a base supporting the screen 2 and the respective projection devices 3 and containing the storage device 4 and the display control device 5 provided therein.

Configuration of Storage Device

The storage device 4 stores image information of the images projected by the respective projection devices 3, and the display control device 5 reads out and writes the image information. As the storage device 4, a memory device having relatively large capacity such as an HDD (Hard Disk Drive) or a semiconductor memory may be exemplified.

Configuration of Display Control Device

The display control device 5 allows the storage device 4 to store image information received from an external apparatus via a network or the like and allows the respective projection devices 3 to project images in response to the image information previously stored in the storage device 4.

Specifically, the display control device 5 individually outputs the images to be projected by the respective projection devices 3 connected to the display control device 5, and allows the corresponding projection devices 3 to project images in response to the image data. Further, the display control device 5 outputs control information and controls operations of the respective projection devices 3 so that the adjacent projection devices 3 of the plurality of projection devices 3 may not project color images in the same color at the same time. The operations of the projection devices 3 will be described later in detail.

Configuration of Screen

Figure 2:
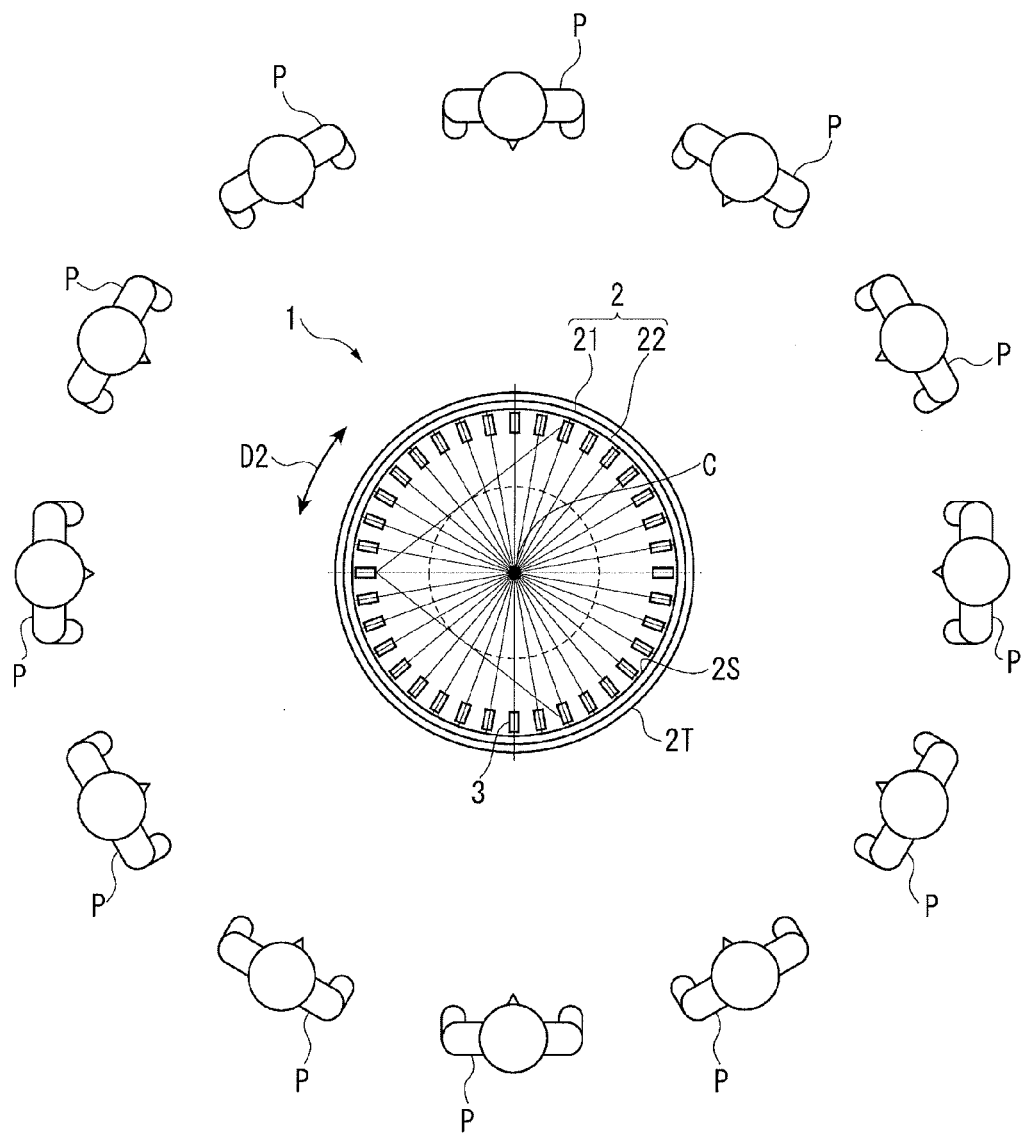
FIG. 2 is a schematic diagram of the display apparatus in the first embodiment as seen from a direction along a center axis.

FIG. 2 is a schematic diagram of the display apparatus 1 as seen from a direction along a center axis C of the screen 2.

As shown in FIG. 2, the screen 2 is the transmissive screen formed in a cylindrical shape around the virtual center axis C. In the embodiment, the screen 2 is provided so that the center axis C may be along the vertical direction. The screen 2 transmits the image lights projected from the respective projection devices 3 provided inside to the outside. The screen 2 has a base member 21 and a diffusion layer 22 located inside of the base member 21. Note that the diffusion layer 22 may be located outside of the base member 21.

In the following explanation, the direction along the center axis C is referred to as "first direction D1" and the circumferential direction around the center axis C is referred to as "second direction D2".

The base member 21 is formed in a cylindrical shape around the center axis C and maintains the shape of the screen 2. The base member 21 is formed using a light-transmissive resin that dims and transmits incident light, glass, or the like, and has a function of attenuating outside light (ambient light) transmitted to the inside of the screen 2. Thereby, diffused reflection caused inside of the screen 2 may be reduced and the contrast of the displayed images may be improved. Note that, not limited to the material, the base member 21 may be formed using a material that transmits nearly all incident lights.

Figure 3:
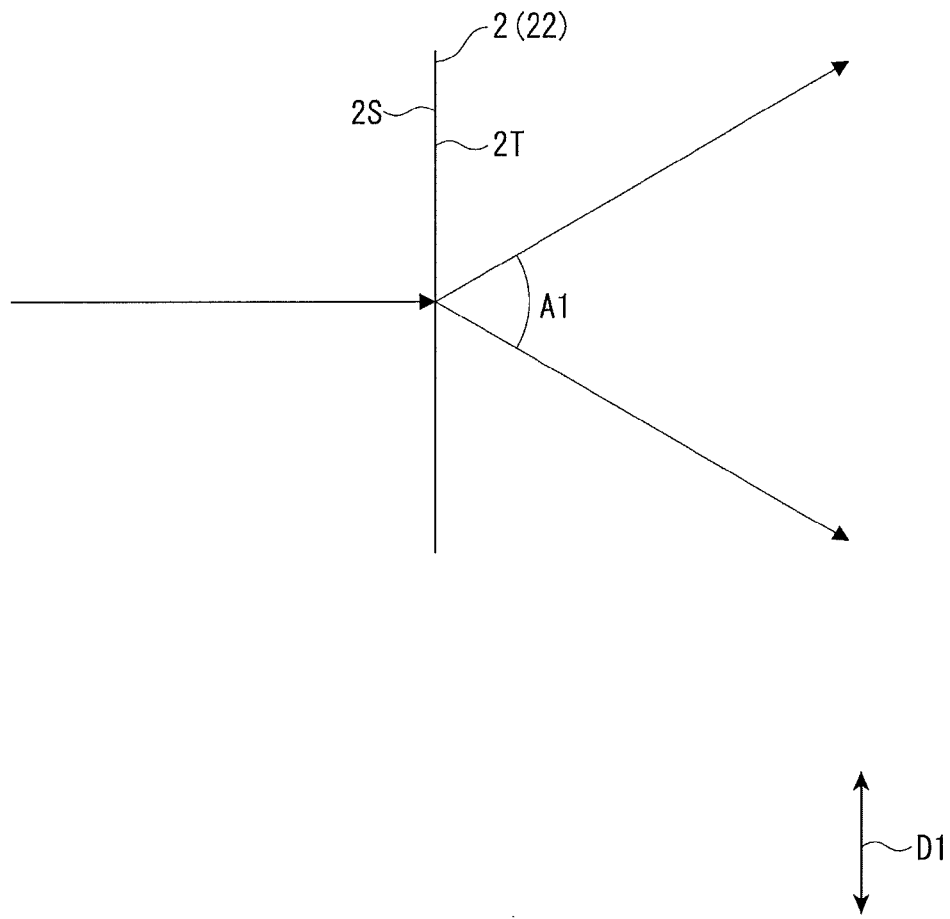
FIG. 3 shows a trajectory of light entering a screen and output in a first direction in the first embodiment.
Figure 4:
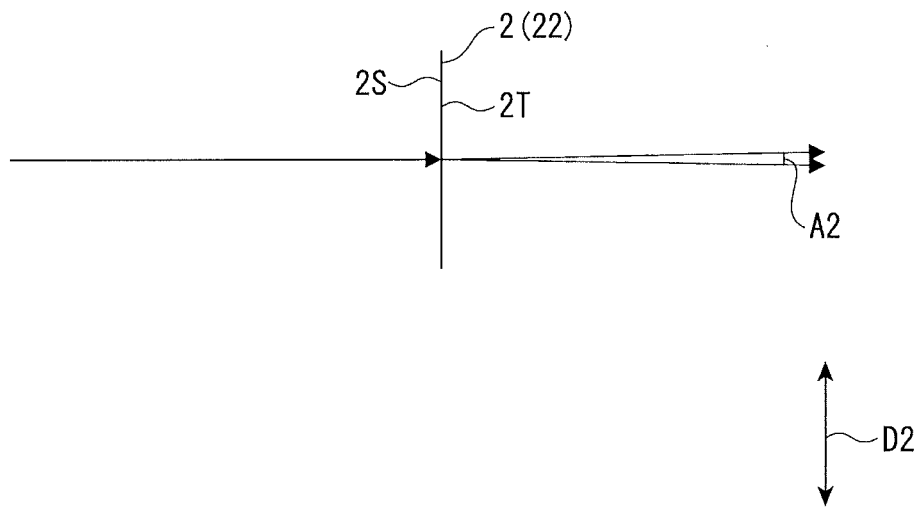
FIG. 4 shows a trajectory of light entering the screen and output in a second direction in the first embodiment.

FIGS. 3 and 4 show trajectories of light entering an inner circumferential surface 2S of the screen 2 and output from an outer circumferential surface 2T. Of them, FIG. 3 shows the trajectory of the light in the first direction D1 and FIG. 4 shows the trajectory of the light in the second direction D2.

When transmitting and outputting the light entering from the inner circumferential surface 2S side, the diffusion layer 22 diffuses the light. As shown in FIGS. 3 and 4, the diffusion layer 22 is adapted so that a diffusion angle A1 of the light in the first direction D1 may be wider than a diffusion angle A2 of the light in the second direction D2. In other words, the diffusion layer 22 is adapted so that the diffusion angle A2 in the second direction D2 may be narrower than the diffusion angle A1 of the light in the first direction D1.

Specifically, in the embodiment, as shown in FIG. 3, the diffusion layer 22 widely outputs and diffuses the light entering from the inner circumferential surface 2S side in the first direction D1, and, as shown in FIG. 4, narrowly outputs the light in the second direction D2. In the embodiment, the diffusion angle A1 is set to be from 40° to 60° and the diffusion angle A2 is set to be from 1° to 2°.

Note that, in the embodiment, the diffusion layer 22 is formed by a diffusion sheet, however, may be realized by a configuration in which cylindrical lenses elongated in the second direction D2 are arranged along the first direction D1.

Configuration of Projection Devices

Figure 5:
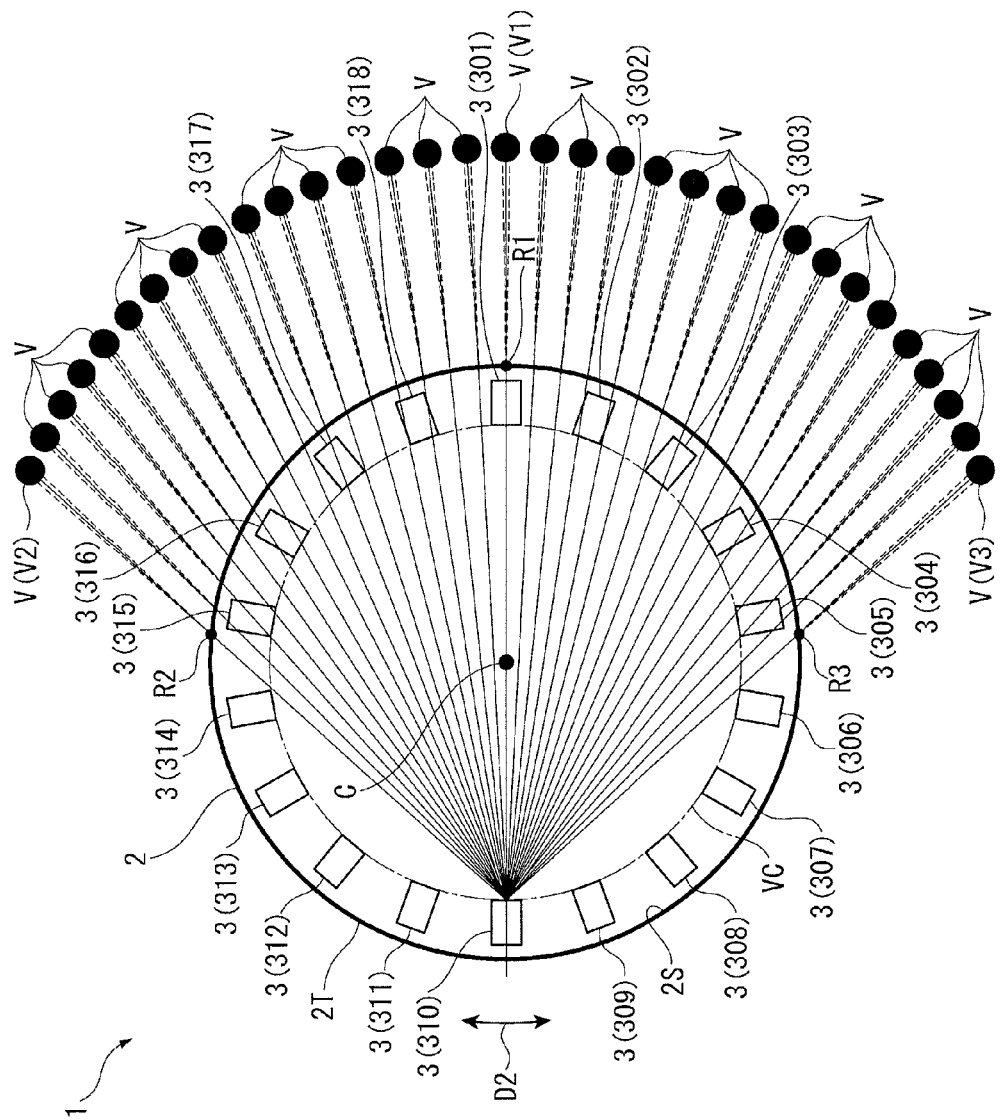
FIG. 5 is a schematic diagram showing an arrangement of projection devices in the first embodiment.

FIG. 5 is a schematic diagram showing an arrangement of the respective projection devices 3 (301 to 318) on the orthogonal surface with respect to the center axis C and showing trajectories of image light projected from one projection device 3 (310). Note that, in FIG. 5, of the image light projected from the projection device 310, beams at predetermined intervals are shown by solid lines and ranges in which the beams are diffused by the diffusion layer 22 are shown by dotted lines.

The plurality of projection devices 3 respectively project images transmitted from the display control device 5, and, in the example shown in FIG. 5, 18 projection devices 3 (301 to 318) are provided on the pedestal 6. As shown in FIG. 5, these projection devices 3 are respectively arranged at equal intervals along a virtual circle VC around the center axis C.

Specifically, these projection devices 3 are arranged so that the output positions of image lights (pupil positions of projection optical units 33, which will be described later) may be located on the virtual circle VC at equal intervals on the virtual circle VC. The virtual circle VC is set inside of the screen 2 and the respective projection devices 3 are entirely located inside of the screen 2. Further, the height position of the virtual circle VC is constant and the pupil positions of the respective projection devices 3 are set to be the positions on the plane orthogonal to the center axis C, i.e., the same height position from the pedestal 6.

These projection devices 3 project images having the same size (in height dimension and width dimension) transmitted from the display control device 5 toward the inner circumferential surface 2S of the screen 2. In other words, the projection devices 3 respectively project the images at the same angle of view.

Relationship between Incident Positions of Image Lights and Viewpoint with respect to Screen Here, the screen 2 diffuses the light entering the inner circumferential surface 2S and outputs the light from the outer circumferential surface 2T, and the light entering the inner circumferential surface 2S is output by the diffusion layer 22 in a narrow range in the second direction D2. Accordingly, a partial image within a predetermined range in a projected image projected from a certain projection device 3 on the screen 2 enters only one viewpoint V of a plurality of viewpoints V sets (viewpoints V shown by black circles in FIG. 5) respectively outside of the screen 2 along the second direction D2. In other words, in the projected image projected on the screen 2 from one projection device 3, a part visually recognized by an eye of the observer P located at a certain viewpoint V is only a portion of the projected image.

For example, of the image lights projected from the projection device 310, the light entering a range R1 on the screen 2 is diffused in the first direction D1 and the second direction D2, and diffused only in the narrow range in the second direction D2. Accordingly, the light enters a viewpoint V1 only of the plurality of viewpoints V. In other words, a partial image formed by the light output by the projection device 310 and entering the range R1 is visually recognized only at the viewpoint V1.

Similarly, of the image lights projected from the projection device 310, the lights entering ranges R2, R3 on the screen 2 enter corresponding viewpoints V2, V3 only of the viewpoints V. Accordingly, partial images formed by the lights output by the projection device 310 and entering the ranges R2, R3 are visually recognized only at the viewpoints V2, V3, respectively.

Similarly, of the image lights projected from the projection device 310, partial images formed by the lights entering the other ranges on the screen 2 are visually recognized only at the corresponding viewpoints V.

Visually Recognized Image at Viewpoint

Figure 6:
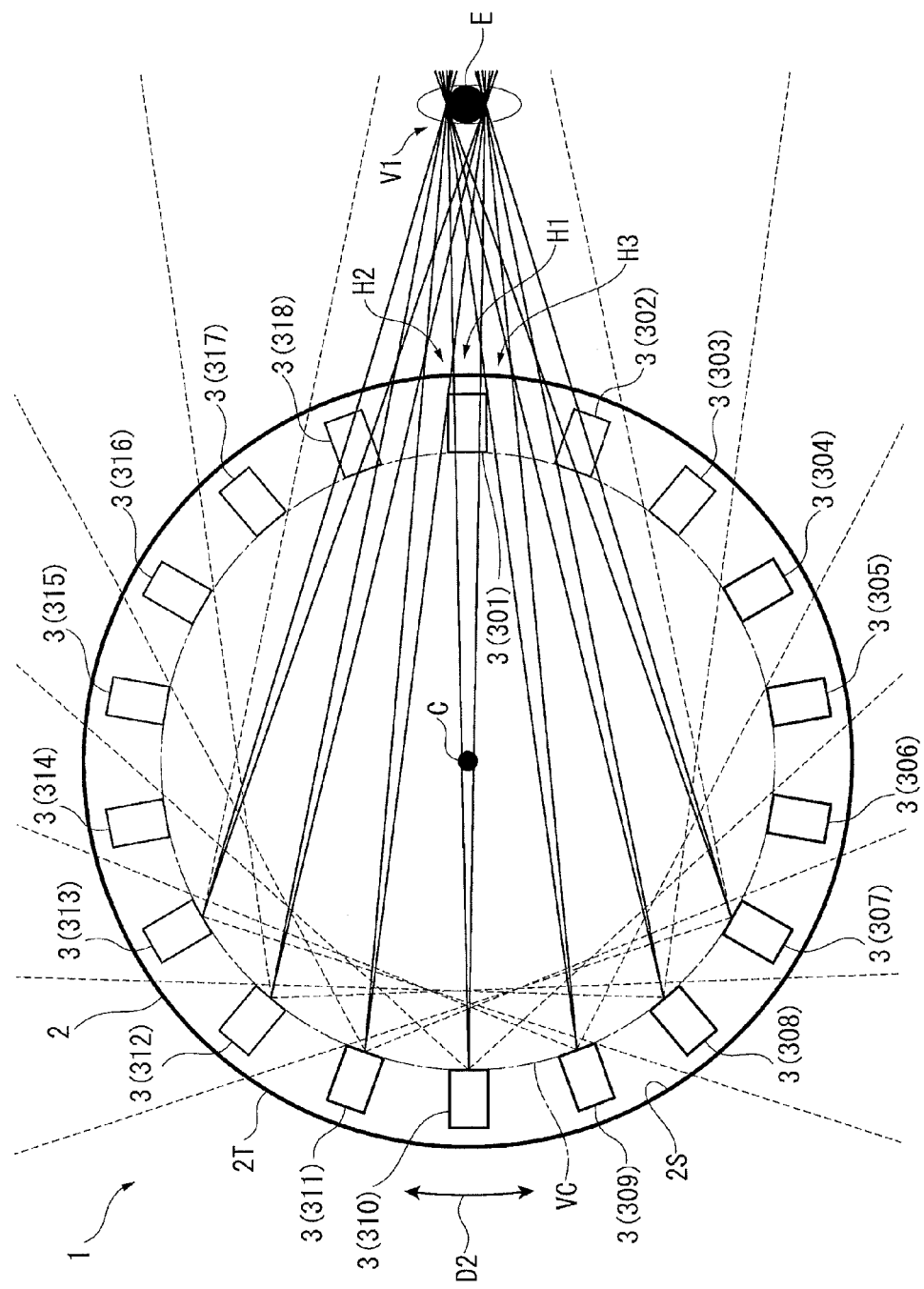
FIG. 6 is a schematic diagram showing trajectories of lights entering a viewpoint in the first embodiment.
Figure 7:
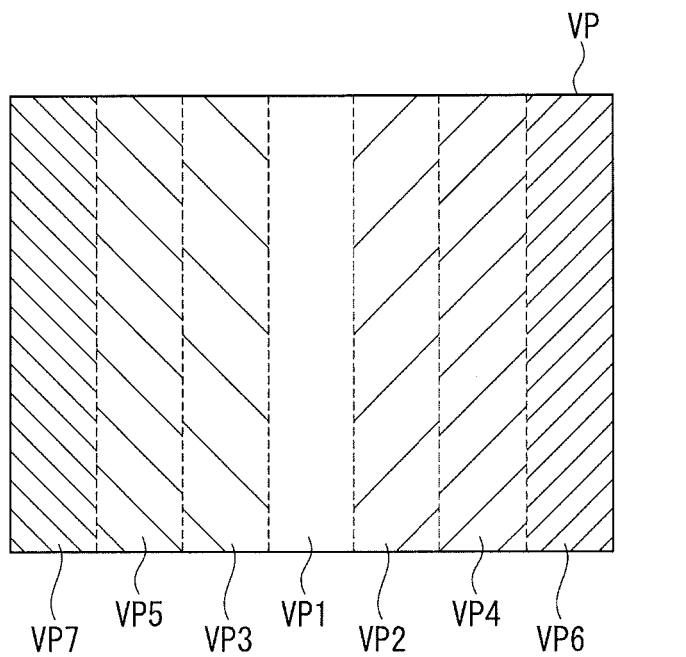
FIG. 7 shows an example of a visually recognized image in the first embodiment.
Figure 7:
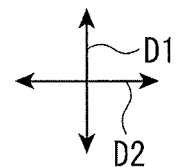

FIG. 6 is a schematic diagram showing trajectories of lights entering the viewpoint V1 via the screen 2. Note that, in FIG. 6, the lights entering the viewpoint V1 from the respective projection devices 3 are shown by solid lines and angles of view of the respective projection devices 3 that project lights are shown by dotted lines. Further, FIG. 7 shows an example of a visually recognized image VP visually recognized by an eye E located at the viewpoint V1.

On the other hand, images visually recognized by the eyes of the observers P located at the respective viewpoints V (visually recognized images) are formed by image lights projected by the plurality of projection devices 3.

For example, in the example shown in FIG. 6, the projection devices 3 that project the lights reaching the viewpoint V1 are the projection devices 307 to 313 located at the opposite side to the viewpoint V1 with respect to the center axis C. Further, of the lights projected by the projection devices 307 to 313, e.g., the visually recognized image VP shown in FIG. 7 is formed.

That is, as shown in FIG. 6, in the projected image of the projection device 310, a range H1 on the screen 2 entering the viewpoint V1 (the range H1 containing the range R1) is a range nearly at the center of the projected image. As shown in FIG. 7, a partial image VP1 corresponding to the range H1 is a partial image forming the center in the visually recognized image VP visually recognized at the viewpoint V1. On the other hand, partial images of the other ranges in the projected image form visually recognized images visually recognized at the other viewpoints V.

Similarly, as shown in FIG. 6, in the projected image of the projection device 311 adjacent to the projection device 310, a range H2 on the screen 2 entering the viewpoint V1 is a range shifted toward the side at which the projection device 311 is located with respect to the projection device 310 from the center in the second direction D2 in the projected image as seen from the viewpoint V1 side. Further, as shown in FIG. 7, a partial image VP2 corresponding to the range H2 is a partial image adjacent to the partial image VP1 in the visually recognized image VP. On the other hand, partial images of the other ranges in the projected image form visually recognized images visually recognized at the other viewpoints V.

Furthermore, as shown in FIG. 6, in the projected image of the projection device 309 adjacent to the projection device 310, a range H3 on the screen 2 entering the viewpoint V1 is a range shifted toward the side at which the projection device 309 is located with respect to the projection device 310 from the center in the second direction D2 in the projected image as seen from the viewpoint V1 side. Further, as shown in FIG. 7, a partial image VP3 corresponding to the range H3 is a partial image adjacent to the partial image VP1 in the visually recognized image VP. On the other hand, partial images of the other ranges in the projected image form visually recognized images visually recognized at the other viewpoints V.

The same applies to the projected images of the other projection devices 307, 308, 312, 313. Portions of the projected images of the projection devices 307, 308 form partial images VP7, VP5 shown in FIG. 7, and portions of the projected images of the projection devices 312, 313 form partial images VP4, VP6 shown in FIG. 7. Further, these partial images VP4 to VP7 are visually recognized at the viewpoint V1. Note that the other portions of the projected images form visually recognized images visually recognized at the other viewpoints V.

As described above, the visually recognized images visually recognized by the eyes E located at the viewpoints V outside of the screen 2 and apart from the screen 2 by predetermined dimensions are formed by portions of the image lights projected by the plurality of projection devices 3.

Projected Images Projected by Projection Devices

Figure 8:
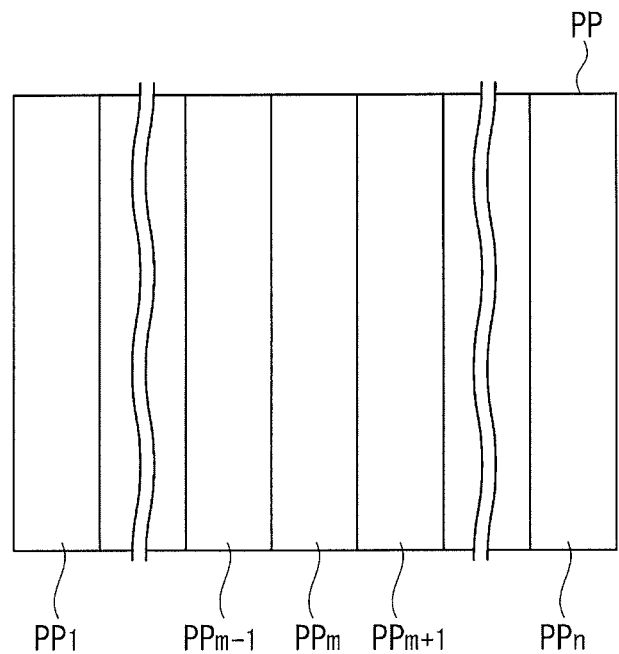
FIG. 8 shows an example of projected images in the first embodiment.
Figure 8:
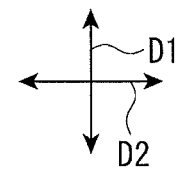

FIG. 8 shows a projected image PP projected from the projection device 310 on the screen 2 as seen from the projection device 310 side and an example of the projected image PP.

As described above, the visually recognized image VP is the image in which portions of projected images from the plurality of projection devices 3 are arranged along the second direction D2. In other words, the respective projection devices 3 project projected images containing the partial images visually recognized at the respective viewpoints V.

For example, as shown in FIG. 8, the projected image PP of the projection device 310 is formed by a plurality of partial images $PP_1$ to $PP_n$ (1<m<n, m and n are natural numbers). The partial image $PP_m$ located at the center of the projected image PP is transmitted through the range H1 and forms the partial image VP1 forming the nearly center of the visually recognized image VP visually recognized at the viewpoint V1.

Further, the partial image $PP_1$ located at one end of the projected image PP in the second direction D2 (an end at the projection device 311 side adjacent to the projection device 310) is transmitted through the range R2 (see FIG. 5) and forms a portion of the visually recognized image visually recognized at the viewpoint V2.

Furthermore, the partial image $PP_n$ located at the other end of the projected image PP in the second direction D2 (an end at the projection device 309 side adjacent to the projection device 310) is transmitted through the range R3 (see FIG. 5) and forms a portion of the visually recognized image visually recognized at the viewpoint V3.

As described above, the respective projection devices 3 project the projected images in which the partial images respectively visually recognized at the different viewpoints V are arranged along the second direction D2 on the screen 2.

Figure 9:
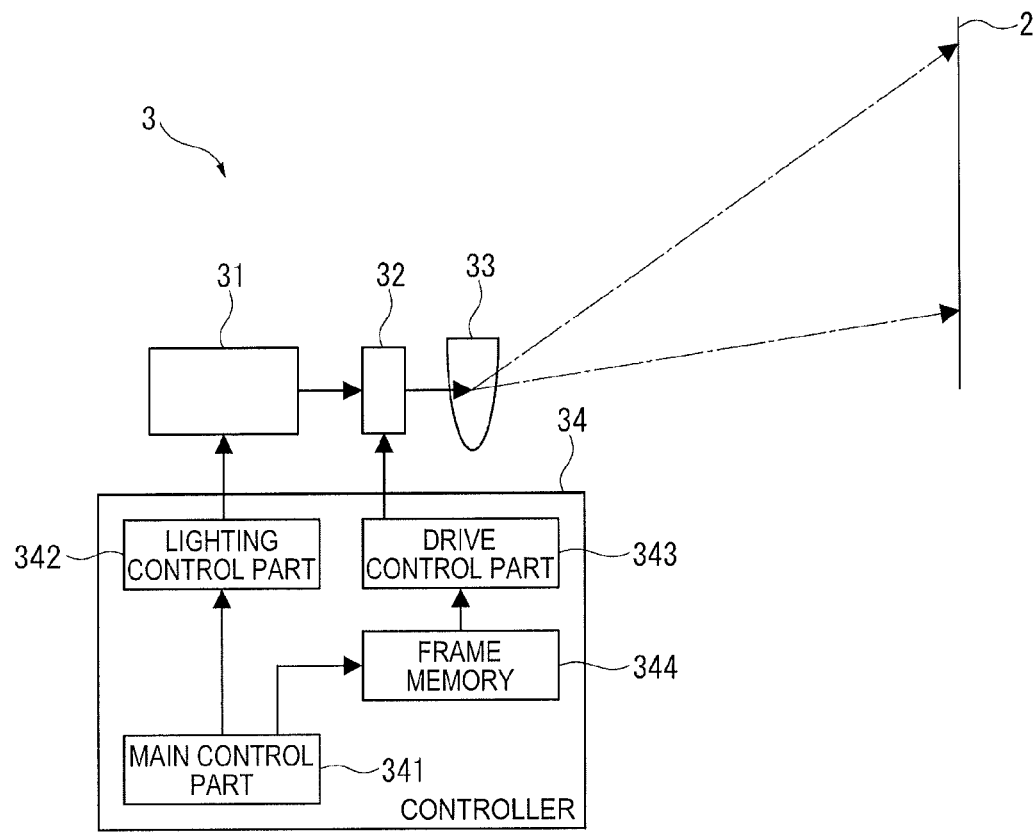
FIG. 9 is a schematic diagram showing a configuration of the projection device in the first embodiment.

FIG. 9 is a schematic diagram showing a configuration of the projection device 3.

As shown in FIG. 9, each of the above described projection devices 3 has a light source unit 31, a light modulator 32, the projection optical unit 33, and a controller 34.

The light source unit 31 respectively outputs respective color lights of red, green, blue in a time-division manner. For example, the light source unit 31 has a red light emitting part, a green light emitting part, and a blue light emitting part respectively including LEDs (Light Emitting Diodes). Note that, not limited to the configuration, but the light source unit 31 may have a light source that outputs white light and a color wheel located in an optical path of the white light and provided with filters that transmit respective color lights of red, green, and blue.

The light modulator 32 respectively modulates the color lights of red, green, and blue output from the light source unit 31 and forms color images in response to the color lights. As the light modulator 32, a modulator using a liquid crystal panel, a micromirror display element, or the like may be employed.

The projection optical unit 33 projects the respective color images formed by the light modulator 32 on the inner circumferential surface 2S. The projection optical unit 33 has a lens tube and at least one lens housed within the lens tube (not shown).

The controller 34 controls operations of the light source unit 31 and the light modulator 32 based on control information and image information transmitted from the display control device 5, which will be described later. The controller 34 has a main control part 341, a lighting control part 342, a drive control part 343, and a frame memory 344.

The main control part 341 allows the frame memory 344 to store the received image information. Further, the main control part 341 outputs a lighting signal and a drive signal to the lighting control part 342 and the drive control part 343 in response to the received control information and controls lighting of the light source unit 31 and driving of the light modulator 32 by the parts.

The lighting control part 342 sequentially outputs the color lights of R (red), G (green), and B (blue) by the light source unit 31 in a period for one frame of the formed projected image based on the lighting signal input from the main control part 341. For example, the lighting control part 342 respectively individually lights the respective light emitting parts of R, G, and B.

Figure 10:
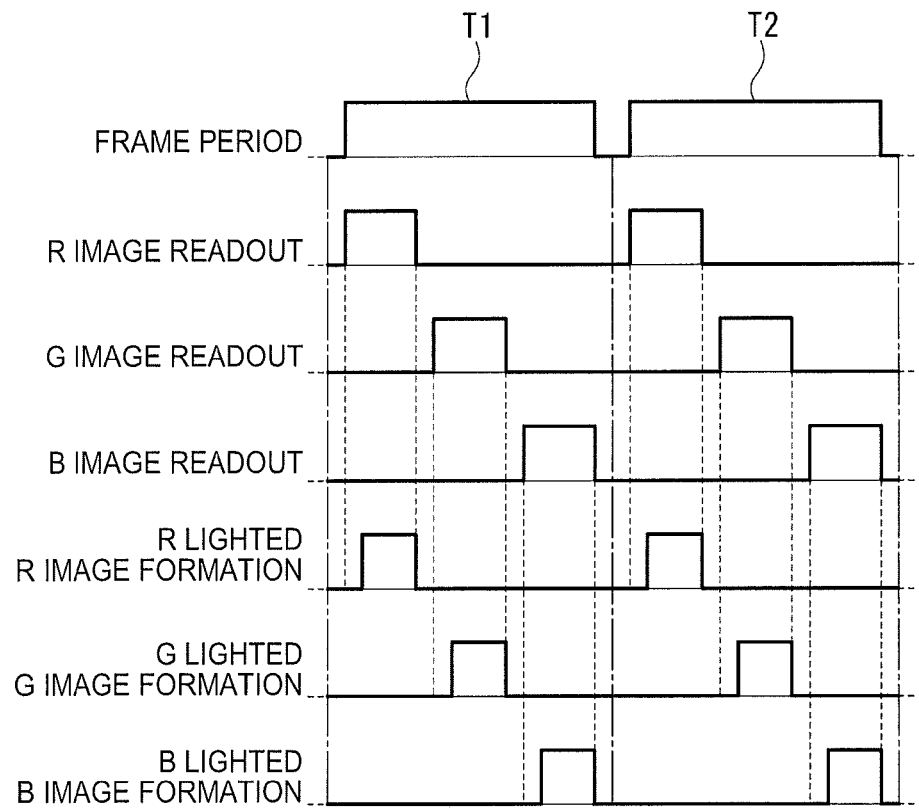
FIG. 10 shows readout timing of image information and output timing of color lights in the first embodiment.

FIG. 10 shows readout timing of the image information stored in the frame memory 344 by the drive control part 343 (i.e., formation timing of color images by the light modulator 32) and output timing of the respective color lights by the lighting control part 342.

The drive control part 343 allows the light modulator 32 to form color images represented by color components in response to the color lights output from the light source unit 31 of the color components contained in the image information stored in the frame memory 344 based on the drive signal.

Specifically, as shown in FIG. 10, the drive control part 343 reads out R components for one frame contained in the image stored in the frame memory 344 in a frame period T1 and supplies data for the R components to the light modulator 32. Then, the lighting control part 342 to which the lighting signal has been input from the main control part 341 lights the R light emitting part of the light source unit 31. Concurrently, the G light emitting part and the B light emitting part are turned off.

Thereby, the light modulator 32 is illuminated by the R light and an R image is formed, and the R image is projected on the screen 2 by the projection optical unit 33.

After the formation of the R image, in the same frame period T1, the drive control part 343 reads out G components for the same one frame as the R components from the frame memory 344 and supplies the G components to the light modulator 32. Then, the lighting control part 342 lights the G light emitting part of the light source unit 31 and turns off the R light emitting part and the B light emitting part.

Thereby, the light modulator 32 is illuminated by the G light and a G image is formed, and the G image is projected on the screen 2 by the projection optical unit 33.

Further, after the formation of the G image, in the same frame period T1, the drive control part 343 reads out B components for the same one frame as the G components from the frame memory 344 and supplies the B components to the light modulator 32. Then, the lighting control part 342 lights the B light emitting part of the light source unit 31 and turns off the R light emitting part and the G light emitting part.

Thereby, the light modulator 32 is illuminated by the B light and a B image is formed, and the B image is projected on the screen 2 by the projection optical unit 33.

Also, in the next frame period T2, an R image, a G image, and a B image in response to the color components of R, G, and B forming the next frame are respectively and sequentially formed, and the respective color images are projected.

As described above, the main control part 341 controls the output timing of the respective color lights of R, G, and B by the lighting control part 342 and the output timing of the respective color components to the light modulator 32 by the drive control part 343.

Then, the R images, the G images, and the B images projected in the respective frame periods are respectively visually recognized, and thereby, the observer P may visually recognize full color images.

Display Timing of Color Images by Respective Projection Devices

Here, when the adjacent respective projection devices 3 project color images in the same color at the same time, flicker is likely to be recognized.

On the other hand, the display control device 5 controls the operations of these projection devices 3 so that the adjacent projection devices 3 out of the plural projection devices 3 may not project color images in the same color at the same time. Specifically, the display control device 5 transmits the control information to the respective projection devices 3 to adjust the sequence of the respective color images displayed in one frame period.

Figure 11:
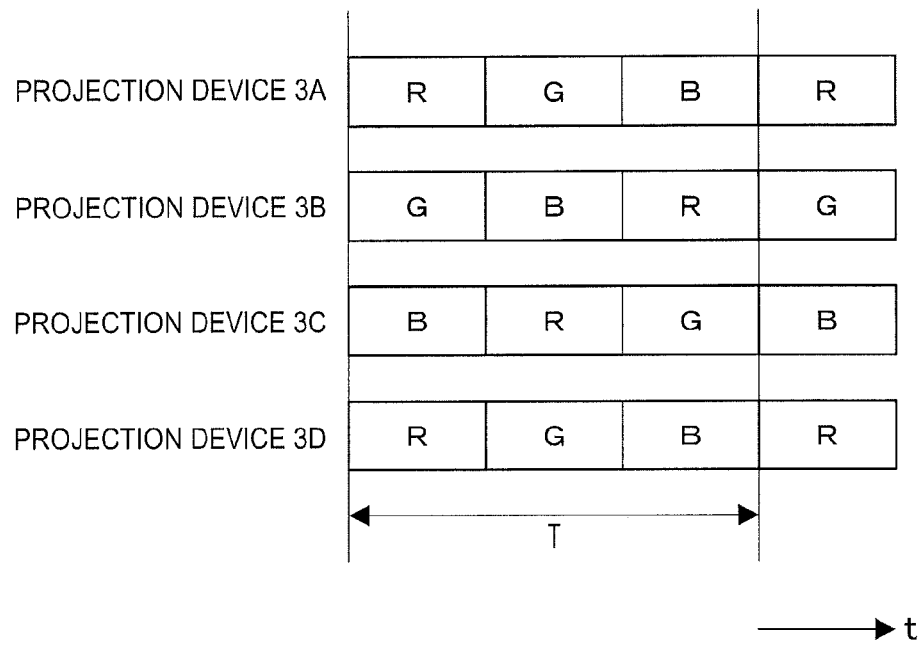
FIG. 11 is a diagram for explanation of projection timing of color images by the adjacent projection devices in the first embodiment.

FIG. 11 is a diagram for explanation of projection timing of color images formed by the adjacent projection devices 3A to 3D of the plurality of projection devices 3.

For example, as shown in FIG. 11, of the four projection devices 3A to 3D adjacent along the second direction D2, the projection device 3A projects color images in the sequence of an R image, a G image, and a B image in one frame period T. On the other hand, the projection device 3B adjacent to the projection device 3A at one side in the second direction D2 projects color images in the sequence of a G image, a B image, and an R image in the same frame period T, and further, the projection device 3C adjacent to the projection device 3B at the one side projects color images in the sequence of a B image, an R image, and a G image in the same frame period T. In addition, the projection device 3D adjacent to the projection device 3C at the one side projects color images in the sequence of an R image, a G image, and a B image in the same frame period T.

As described above, the respective projection devices 3 adjacent along the second direction D2 of the plurality of projection devices 3 do not project the color images in the same colors at the same time, and occurrence of flicker may be suppressed.

Note that, in the respective projection devices 3, the sequence of the colors output by the light source unit 31 and the sequence of the color images formed by the light modulator 32 may be set with respect to each projection device 3 in advance, or randomly set with respect to each projection device 3 by the display control device 5.

Relationship between Diffusion Angle of Screen and Number of Projection Devices

Here, relationships among the diffusion angle of light by the screen 2 (the diffusion angle of light in the second direction D2 by the diffusion layer 22), the number of projection devices 3, the diameter of the virtual circle VC, and the diameter of the screen 2 will be explained. Note that, in FIGS. 12 and 13, it is assumed that the pupil positions of the projection optical units 33 of the respective projection devices 3 are set to positions apart from the center axis C in the same dimension of the radius of the screen 2.

Figure 12:
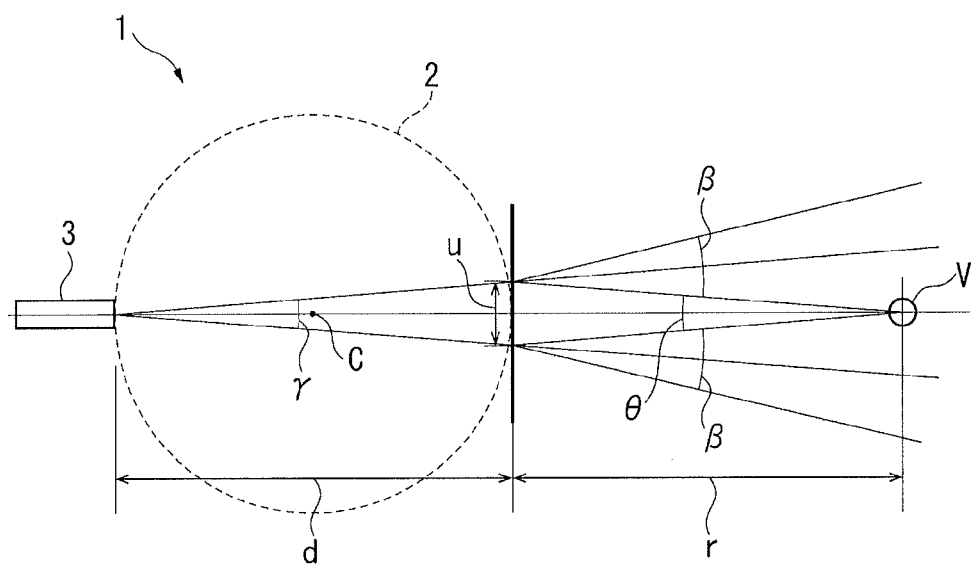
FIG. 12 shows a trajectory of light reaching a viewpoint from one projection device in the first embodiment.

FIG. 12 shows a trajectory of light reaching the viewpoint V from one projection device 3 in the plane orthogonal to the center axis C.

Each projection device 3 projects image light forming the projected image at the angle of view toward the inner circumferential surface 2S. In this regard, as shown in FIG. 12, one fine beam contained in the image light is transmitted through the inner circumferential surface 2S, diffused in the second direction D2 at a diffusion angle β by the diffusion layer 22, and output from the outer circumferential surface 2T. Then, at the viewpoint V located within the range of the output beam spreading at the diffusion angle β, an image formed by the output beam (partial image) is visually recognized on the screen 2. At the viewpoint V in this case, the image is visually recognized on the screen 2 as an image having a dimension u in the dimension in the second direction D2.

Here, supposing that a projection distance of the projection device 3 (a distance from the pupil position of the projection optical unit 33 to the inner circumferential surface 2S) is d, an observation distance (the shortest distance from the viewpoint V to the screen 2) is r, a projection angle of light from the projection device 3 when the light projected from the projection device 3 enters a certain viewpoint V is γ, and an viewing angle from the viewpoint V with respect to the image by the light is θ, the dimension u is expressed by the following formula (2) and θ is expressed by the following formula (3). Note that the projection angle γ and the viewing angle θ are angles in the plane orthogonal to the center axis C.

$$u \approx r\theta \approx d\gamma \tag{2}$$

$$\theta = \beta - \gamma \tag{3}$$

From these formulae (2) and (3), the projection angle γ is expressed by the following formula (4), and the dimension u is expressed by the following formula (5).

$$\gamma \approx r\beta/(d+r) \tag{4}$$

$$U \approx d\gamma \approx dr\beta/(d+r) \tag{5}$$

Figure 13:
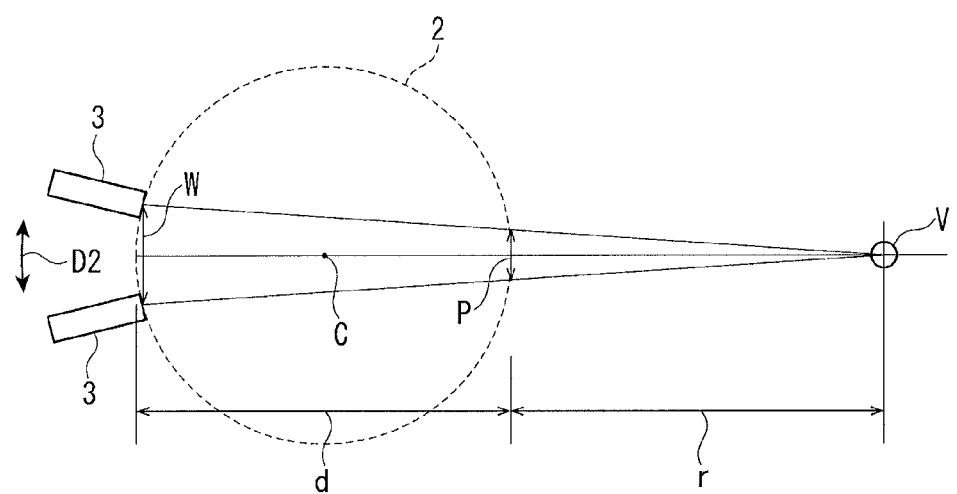
FIG. 13 shows a trajectory of light when beams projected from two adjacent projection devices reach a certain viewpoint in the first embodiment.

FIG. 13 shows a trajectory of light when beams projected from two projection devices 3 adjacent in the second direction D2 reach a certain viewpoint V.

Next, with reference to FIG. 13, how optical axes of the beams by the two projection devices 3 adjacent in the second direction D2 are seen will be explained.

An interval w between the pupil positions in the two projection devices 3 is recognized as an interval p on the screen 2. Note that the beam from the projection device 3 has a predetermined width, and the intervals w, p may be treated as intervals of center axes of the beams projected from the adjacent two projection devices 3 and entering the same viewpoint V. The ratio of the interval p to the interval w is expressed by the following formula (6), and the interval p is expressed by the following formula (7). Note that d and r in the formulae (6) and (7) are the projection distance d and the observation distance r as described above, respectively.

$$p/w=r/(d+r) \qquad (6)$$

$$p=wr/(d+r) \qquad (7)$$

Here, supposing that a ratio (u/p) of the dimension u to the interval p is a filling rate $\eta$, the following formula (8) may be derived from the formulae (5) and (7).

$$\eta=u/p\approx d\beta/w \qquad (8)$$

If the filling rate $\eta$ is less than one, gaps appear between the strip-shaped partial images VP1 to VP7 in the visually recognized image VP shown in FIG. 7, and, if the filling rate $\eta$ is more than one, the partial images VP1 to VP7 are seen with overlaps with each other. On the other hand, if the filling rate $\eta$ is one, the respective partial images VP1 to VP7 in the visually recognized image VP may be visually recognized as images arranged along the second direction D2 without gaps or overlaps.

Now, in the case where n projection devices 3 are arranged on the entire circumference around the center axis C, the interval w between the respective pupil positions is expressed by the following formula (9), and the filling rate $\eta$ may be expressed by the following formula (10).

$$w\approx d\pi/n \qquad (9)$$

$$\eta\approx d\beta/w=n\beta/\pi \qquad (10)$$

Further, supposing that the diffusion angle $\beta$ is expressed by a diffusion angle $\delta$ converted from radian to degrees, the diffusion angle $\beta$ is expressed by the following formula (11), and the filling rate $\eta$ may be expressed by the following formula (12) based on the above formula (10) and the formula (11). That is, the filling rate $\eta$ may be expressed by the diffusion angle $\delta$ and the number n of projection devices 3.

$$\beta=\delta\pi/180 \qquad (11)$$

$$\eta\approx n\beta/\pi=n\delta/180 \qquad (12)$$

Figure 14:
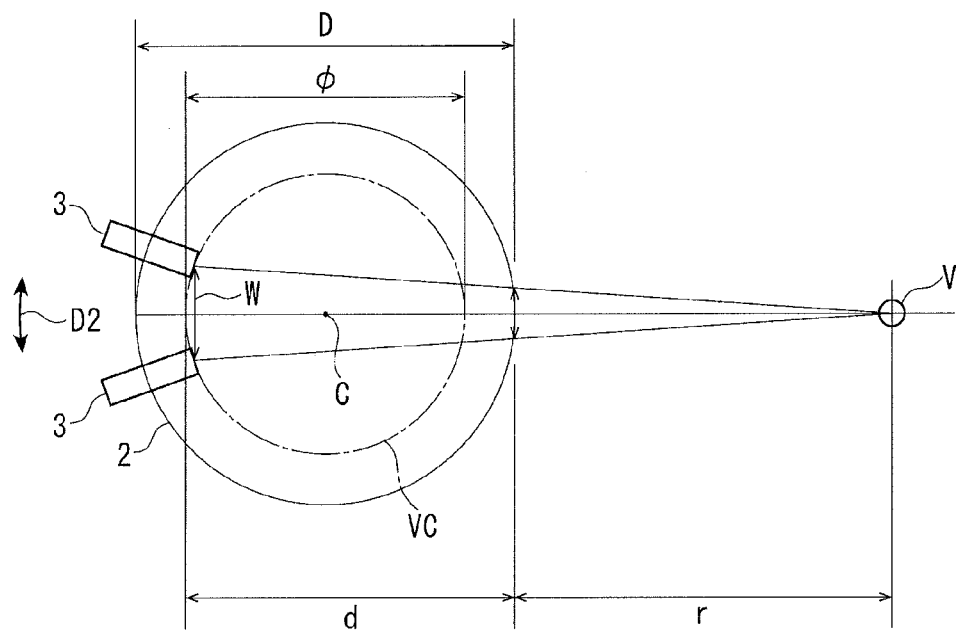
FIG. 14 is a schematic diagram of a display apparatus in which a diameter of a virtual circle on which pupil positions of the projection devices are arranged and a diameter of the screen are different as seen the direction of the center axis in the first embodiment.

FIG. 14 is a schematic diagram of the display apparatus 1 in which the diameter $\phi$ of the virtual circle VC on which pupil positions of the projection devices are arranged and the diameter D of the screen 2 are different as seen the direction of the center axis C.

On the other hand, in the case where the respective projection devices 3 are arranged at equal intervals along the second direction D2 so that the pupil positions may be located on the virtual circle VC around the center axis C having the diameter $\phi$ different from the diameter D of the screen 2, the interval w between the respective pupil positions is expressed by the following formula (13). Accordingly, the filling rate $\eta$ is expressed by the following formula (14) based on the formulae (11), (12), and (13).

$$w\approx\phi\pi/n \qquad (13)$$

$$\eta\approx d\beta/w=n\beta/\pi\times d/\phi=n\delta/180\times d/\phi \qquad (14)$$

Therefore, in the case where the diameter D of the screen 2 and the diameter $\phi$ of the virtual circle VC on which the output pupil positions of the respective projection devices 3 are arranged are different, as expressed by the formula (14), it is known that the case where the diameter D and the diameter $\phi$ are the same (the case expressed by the formula (10)) is multiplied by a ratio (d/$\phi$) of the projection distance d to the diameter $\phi$ as a coefficient.

Further, the relationship among the diameter D, the diameter $\phi$, and the projection distance d is expressed by the following formula (15), and the formula (14) is expressed by the following formula (16) based on the formula (15).

$$d=(D+\phi)/2 \qquad (15)$$

$$\eta\approx n\delta/180\times d/\phi=n\delta/360\times(D/\phi+1) \qquad (16)$$

On the basis of the formula (16), the diffusion angle $\delta$ when $\eta$=1 as a condition for visual recognition of the respective partial images without gaps or overlaps in the visually recognized image is expressed by the following formula (17).

$$\delta=360/n\times 1/(D/\phi+1) \qquad (17)$$

By thus expressed formula (17), it is known that an appropriate diffusion angle $\delta$ may be obtained in response to the number n of projection devices 3 arranged at equal intervals on the virtual circle VC, the diameter D of the screen 2, and the diameter $\phi$ of the virtual circle VC (arrangement diameter). Note that an optimum diffusion angle $\delta$ may be obtained in response to the projection distance d in place of the diameter D of the screen based on the formula (14), and an optimum diffusion angle $\delta$ may be obtained in response to the projection distance d in place of the diameter $\phi$ of the virtual circle VC based on the formula (15).

Further, as shown in FIGS. 12 and 13, when the diameter D of the screen 2 and the diameter $\phi$ of the virtual circle VC are the same, an optimum diffusion angle $\delta$ corresponding to the filling rate $\eta$=1 may be expressed by the following formula (18) based on the formula (12) or (17). In other words, when the diameter D of the screen 2 and the diameter $\phi$ of the virtual circle VC are the same, an optimum diffusion angle $\delta$ may be obtained in response to the number n of projection devices 3 arranged at equal intervals so that the output pupil positions may be located on the virtual circle VC.

$$\delta==180/n \qquad (18)$$

Furthermore, according to the display apparatus 1 to which the diffusion angle $\delta$ obtained by the formulae (17) and (18) is applied, the visually recognized image VP formed by the plurality of partial images arranged along the second direction D2 without gaps or overlaps may be visually recognized by the eye E located at the viewpoint V.

For example, according to the formula (18), in the case of the display apparatus 1 in which 90 projection devices 3 are arranged at equal intervals so that the output pupil positions may be located on the virtual circle VC having the diameter $\phi$ equal to the diameter D of the screen 2, if the diffusion angle $\delta$ of the screen 2 is two degrees, the visually recognized images VP formed by the plurality of partial images arranged along the second direction D2 without gaps or overlaps may be visually recognized by the eyes E located at the respective viewpoints V.

Advantages of First Embodiment

According to the above described display apparatus 1, the following advantages may be exhibited.

The image lights projected on the inner circumferential surface 2S of the screen 2 from the plurality of projection devices 3 are output to be wider in the first direction D1 and narrower in the second direction D2 when output from the outer circumferential surface 2T of the screen 2. Accordingly, for example, at the viewpoint V1 of the plurality of viewpoints V located outside of the outer circumferential surface 2T and set along the second direction D2, as shown in FIG. 6, in the projected images by the projection devices 307 to 313, an image in which images of the respective different portions (partial images VP1 to VP7) are arranged along the second direction is virtually recognized. Further, the display control device 5 allows the respective projection devices 3 to project the projected images with the partial images in the positions where the images enter the respective viewpoints V as the partial images corresponding to the viewpoints V, and thereby, different images may be visually recognized at the respective viewpoints V. In this regard, the display control device 5 allows the respective projection devices 3 to project projected images as images of the same stereoscopic image of an observation object respectively seen from the positions in response to the view points, which form the visually recognized images at the respective viewpoints V, and thereby, the observation object contained in the visually recognized images may be stereoscopically visually recognized.

Then, the visually recognized image is the image in which the partial images projected from the respective projection devices 3 are arranged along the second direction D2, and the resolution of the visually recognized image may be improved and the visually recognized image may be clearly visually recognized. Therefore, the observer P changes the viewpoint, and thereby, may clearly visually recognize the observation object contained in the visually recognized image as a stereoscopic image by motion parallax.

Note that, when the interval between the respective viewpoints V is set to an amplitude of convergence of human eyes (a width dimension between eyes), the observer P may visually recognize a parallax image with right and left eyes. Therefore, not only by the motion parallax but also by the binocular parallax, the observation object contained in the visually recognized image may be visually recognized as a stereoscopic image.

The output parts (pupil positions) of the image lights in the plurality of projection devices 3 are located inside of the cylindrical screen 2 when the display apparatus 1 is seen the direction of the center axis C. According to the configuration, the display apparatus 1 may be downsized. Further, when the display apparatus 1 is seen the direction of the center axis C, if the respective projection devices 3 are located inside of the cylindrical screen 2, the display apparatus 1 may be further downsized.

The value of the diffusion angle δ derived by the formula (17) is used as the diffusion angle of light of the screen 2 in the second direction D2, and thereby, in the visually recognized image visually recognized at the viewpoint V, gaps and overlaps between partial images projected from the respective adjacent projection devices 3 may be suppressed. Therefore, the visually recognized image in which the partial images projected from the respective projection devices 3 are arranged in the second direction D2 may be easily visually recognized as one displayed image.

The respective projection devices 3 modulate the red lights, the green lights, and the blue lights respectively and individually output from the light source units 31 in time-division manners using the light modulators 32, the projection optical units 33 project color images in response to the respective color lights, and thereby, one image (frame) is displayed. In this regard, in the respective projection devices 3 arranged at equal intervals along the second direction D2 on the virtual circle VC around the center axis C, the adjacent projection devices 3 project color images in different colors at the same time. Thereby, as described above, occurrence of flicker may be suppressed in the visually recognized images.

Modified Example of First Embodiment

Figure 15:
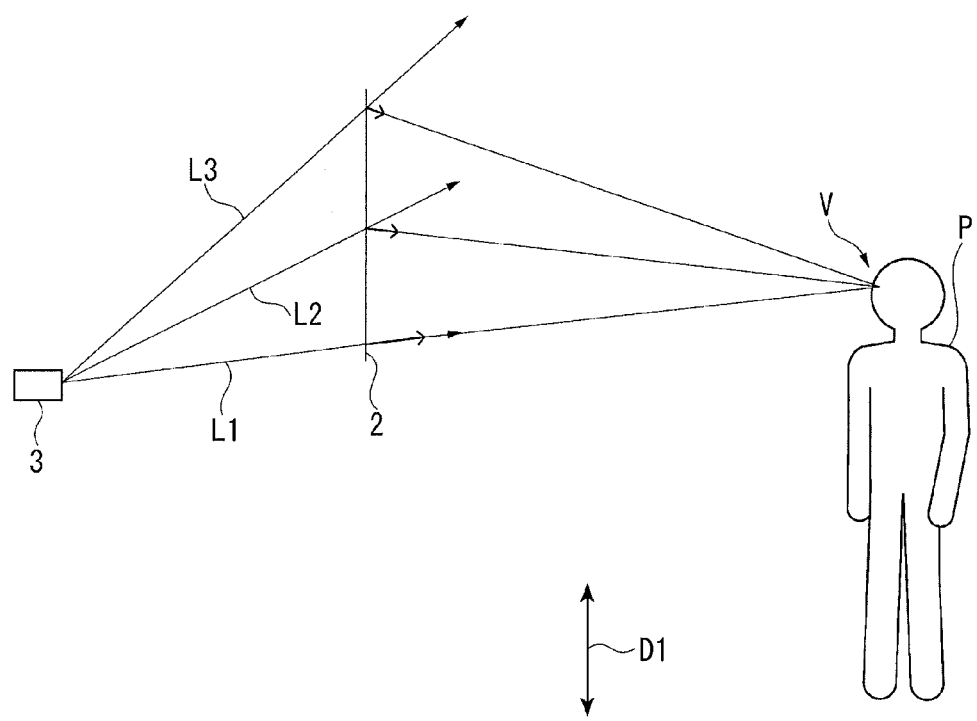
FIG. 15 is a schematic diagram showing trajectories of image lights projected by the projection device located on one end side in the first direction with respect to the screen in the first embodiment.

FIG. 15 is a schematic diagram showing trajectories of image lights projected by the projection device 3 located at one end side in the first direction D1 with respect to the screen 2. Note that, in FIG. 15, in the projection range of the image by the projection device 3, a beam L1 passing through one end in the first direction D1, a beam L2 passing through the center, and a beam L3 passing through the other end are shown.

In the above described display apparatus 1, the transmissive screen 2 having the base member 21 and the diffusion layer 22 are provided. In the display apparatus 1 having the screen 2, for example, as shown in FIG. 15, when the projection device 3 is provided at one end (e.g., the lower side in the vertical direction) in the first direction D1 with respect to the screen 2, an incident angle of the image light entering the inner circumferential surface 2S of the screen 2 from the projection device 3 (an angle with respect to the normal of the screen 2 in the incident position of the image light) is larger from one end side toward the other end side. The diffusion layer 22 diffuses the light relatively widely in the first direction D1 as described above, and the light entering the screen 2 is likely to be output from the outer circumferential surface 2T with the incident angle with respect to the inner circumferential surface 2S maintained. That is, the light entering the screen 2 is likely to be output on an extended line in the incident direction of the light to the screen 2 from the outer circumferential surface 2T.

Accordingly, the beam L1 projected from the projection device 3 and entering a region at the one end side in the screen 2 is output at a smaller output angle (an angle with respect to the normal of the outer circumferential surface 2T in response to the incident position of the image light), and thus, for example, is likely to reach the viewpoint V apart in a predetermined dimension from the position nearly at the center in the first direction D1 in the screen 2. However, the beams L2, L3 entering regions nearly at the center and the other end side in the first direction D1 in the screen 2 are mainly output toward the other end side at larger output angles, and harder to reach the viewpoint V. In the configuration, a visually recognized image with lower resolution toward the other end side is visually recognized by the eye of the observer P located at the viewpoint V. That is, brightness unevenness is caused in the visually recognized image.

Figure 16:
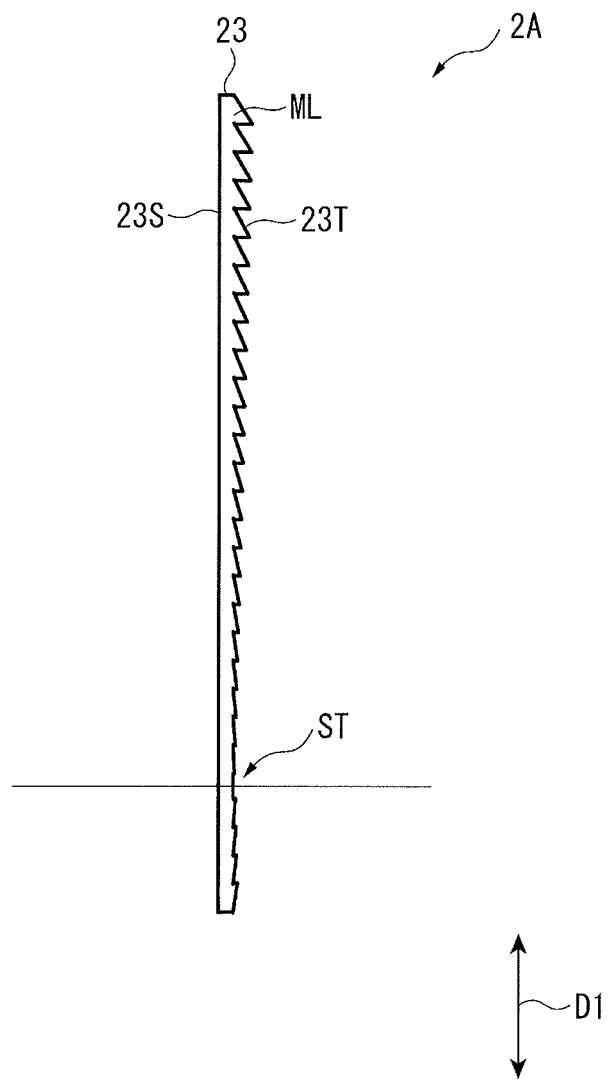
FIG. 16 is a sectional view showing a direction adjustment layer in the first embodiment.

FIG. 16 is a sectional view showing a direction adjustment layer 23 of a screen 2A.

To address the problem, in place of the screen 2, the screen 2A further having the direction adjustment layer 23 in addition to the base member 21 and the diffusion layer 22 may be employed.

Of them, the direction adjustment layer 23 adjusts the output direction of light transmitted through the inside. Specifically, the direction adjustment layer 23 has a function of adjusting the output direction of incident light toward the viewpoint V side. In the embodiment, as shown in FIG. 16, the direction adjustment layer 23 is formed using a linear Fresnel sheet having concavities and convexities on an outer circumferential surface 23T, and an inner circumferential surface 23S is formed to be nearly flat. Further, the inclination angle of an inclined surface of a micro lens ML with respect to the inner circumferential surface 23S is larger as the inclined surface is farther from a reference position ST set in the position at the side where the projection device 3 is provided (a reference position ST in the first direction D1) in the direction adjustment layer 23. These micro lenses ML are formed by thinning of a cylindrical lens in the second direction D2 unlike a Fresnel lens formed by thinning of a general rotationally symmetric lens and have inclined parts of the lenses from the reference position ST in the first direction D1. Accordingly, the respective micro lenses ML have a collecting action only with respect to the first direction D1.

By the direction adjustment layer 23, the main output direction of the light entering the inner circumferential surface 23S is adjusted in a direction toward the viewpoint V.

Note that the direction adjustment layer 23 may be formed using a sheet in which cylindrical lenses are arranged with fine pitches. Further, the direction adjustment layer 23 may be provided at the light-incident side with respect to the diffusion layer 22 or provided at the light-exiting side. The same applies to the base member 21.

Figure 17:
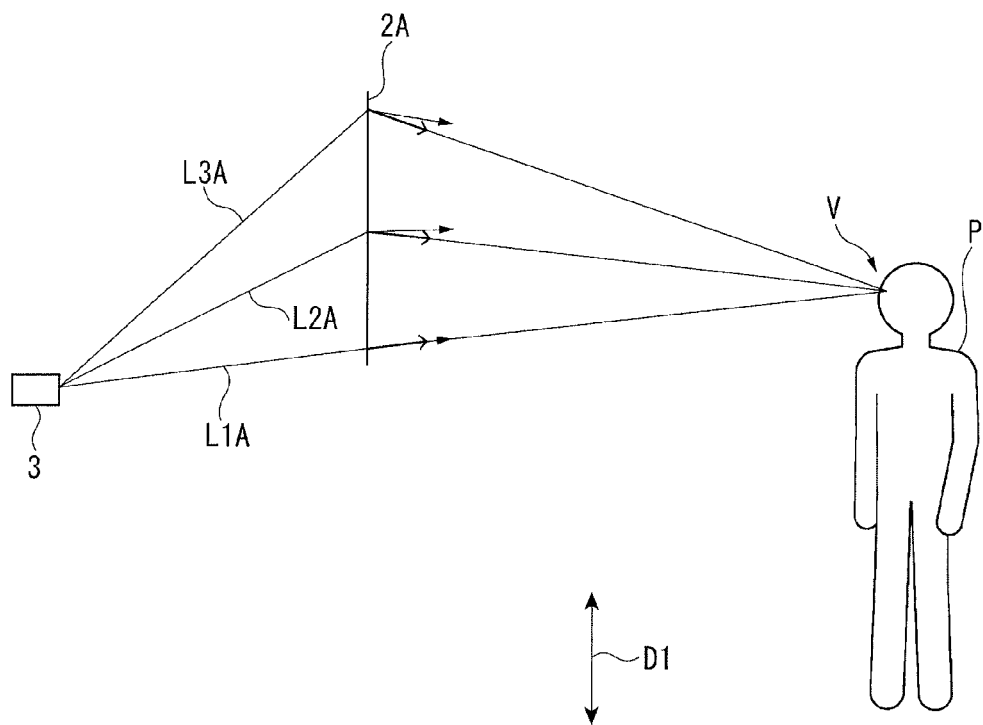
FIG. 17 is a schematic diagram showing trajectories of image lights projected by the projection device located on one end side in the first direction with respect to the screen in the first embodiment.

FIG. 17 is a schematic diagram showing trajectories of image lights projected by the projection device 3 located on one end side in the first direction D1 with respect to the screen 2A.

Of image lights entering the screen 2A, a beam L1A entering a region at the one end side in the first direction enters the vicinity of the reference position ST, and the output direction of the beam L1A is harder to be adjusted by the direction adjustment layer 23. Accordingly, the beam L1A is mainly output from the outer circumferential surface 2T on an extended line in the incident direction to the screen 2A toward the viewpoint V.

On the other hand, of the image lights entering the screen 2A, output directions of beams L2A, L3A entering regions nearly at the center and the other end side in the first direction D1 are changed toward the one end side by the micro lenses of the direction adjustment layer 23. The angles formed between the output directions and the incident directions are set to be larger as the angles are farther from the reference position ST in the screen 2A. Accordingly, as the incident position of light to the screen 2A is closer to the other end side in the first direction D1, the light is output closer to the one side. Thereby, the beams L2A, L3A entering the screen 2A are easily directed toward the viewpoint V.

The above described screen 2A is employed, and thereby, brightness unevenness may be suppressed in the image projected from the projection device 3 located at one side in the first direction D1 with respect to the screen 2A and visually recognized at the viewpoint V.

Note that, in the above description, the projection device 3 is located at the one end side with respect to the screen 2A, however, not limited to that. The device may be located at the other end side. Also, in this case, the output direction of the incident light is adjusted by the direction adjustment layer 23, and thereby, the image light entering the screen 2A may be easily directed toward the viewpoint V and brightness unevenness may be suppressed in the visually recognized image.

Second Embodiment

Next, the second embodiment of the invention will be explained.

A display apparatus according to the embodiment has the similar configuration and function to the above described display apparatus 1, and is different from the above described display apparatus 1 in that the position of the observer P is detected and an image suitably visually recognizable in the position is formed and projected. Note that, in the following explanation, the same signs are assigned to the same or nearly the same parts as the parts that have been already described and their explanation will be omitted.

Figure 18:
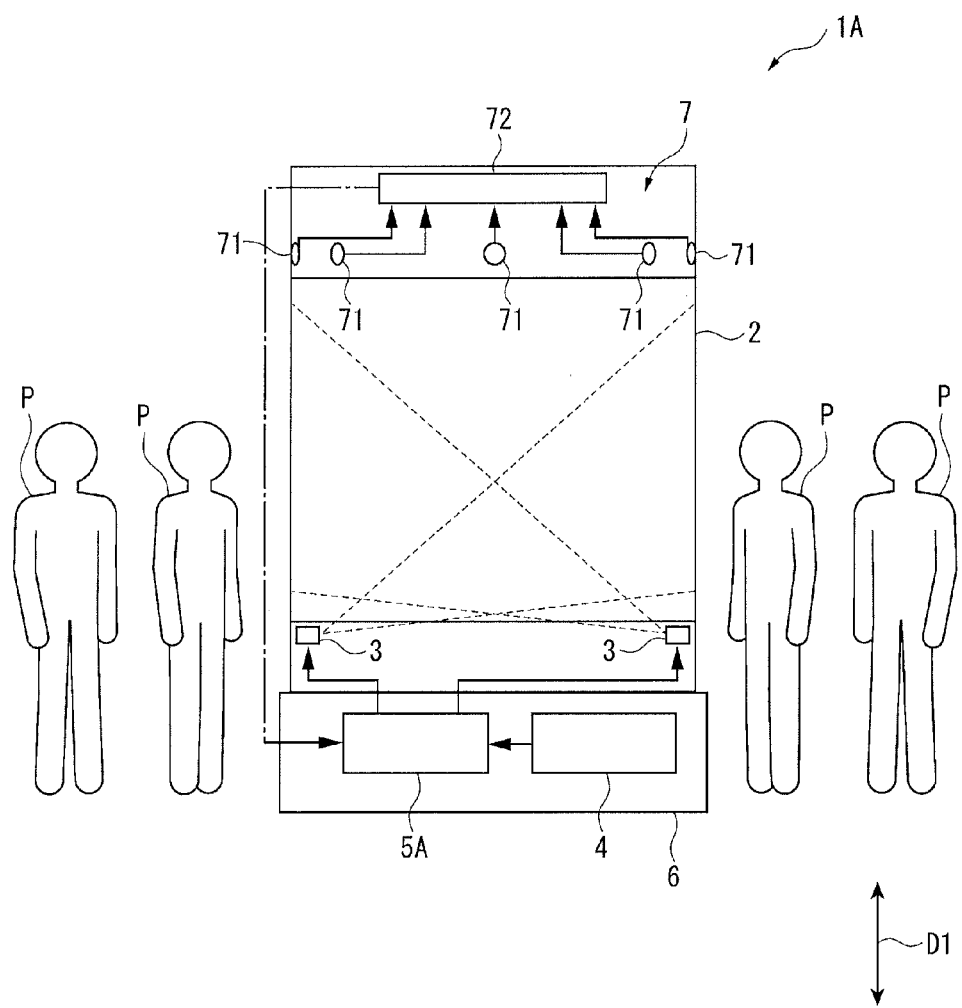
FIG. 18 is a schematic diagram showing a display apparatus according to the second embodiment of the invention.

FIG. 18 is a schematic diagram showing a display apparatus 1A according to the embodiment.

The display apparatus 1A according to the embodiment has the same configuration and function as the display apparatus 1 except that a display control device 5A is provided in place of the display control device 5 and a detection device 7 that detects positions and distances of observers is further provided. Note that, in place of the screen 2, the screen 2A may be employed for the display apparatus 1A.

Configuration of Detection Device

Figure 19:
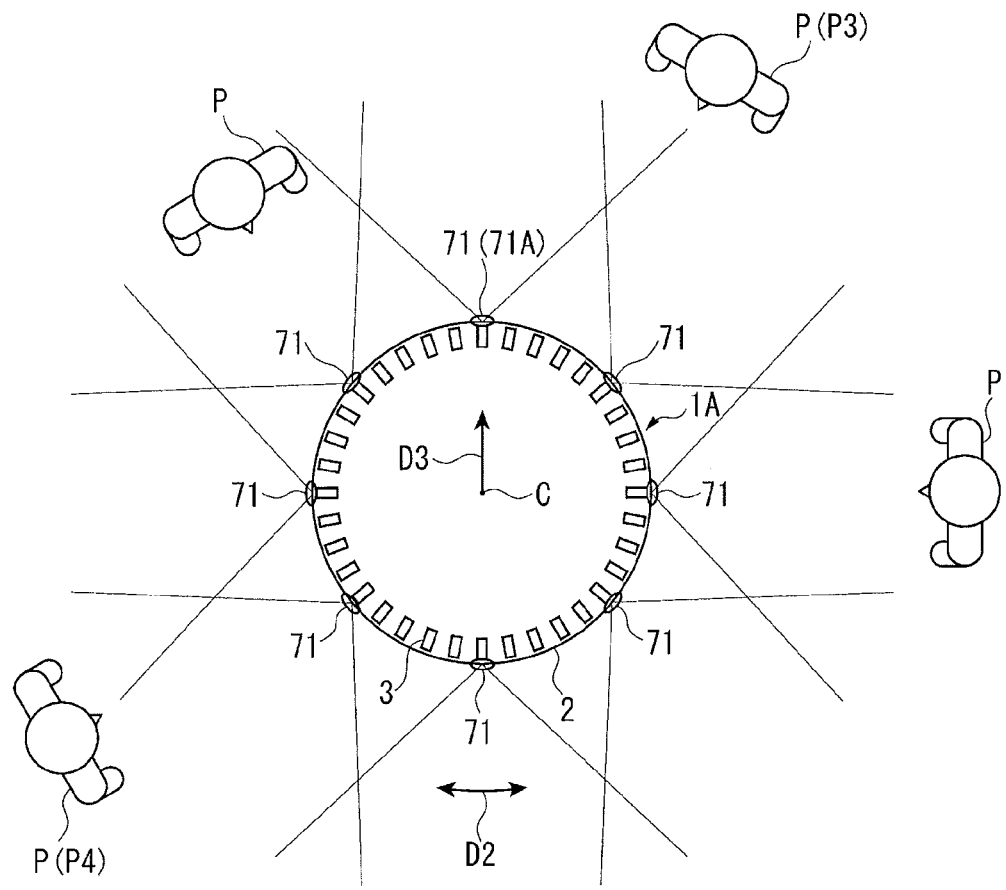
FIG. 19 is a schematic diagram showing an example of an arrangement of detection units in the second embodiment.

FIG. 19 is a schematic diagram showing an example of an arrangement of respective detection units 71 on a plane orthogonal to the center axis C in the display apparatus 1A.

The detection device 7 has a plurality of detection units 71 and a processing unit 72.

The plurality of detection units 71 detect positions of observers P within respective detection ranges, i.e., directions toward the positions of the observers P from the center axis C of the screen 2 and distances between the observers P and the center axis C of the screen 2. As shown in FIGS. 18 and 19, these detection units 71 are respectively arranged at equal intervals along the outer circumferential surface 2T of the screen 2 (in the example of FIG. 19, eight detection units 71 are arranged at equal intervals). Further, the respective detection units 71 output detection results to the processing unit 72.

As the detection units 71, a configuration having a range image sensor such as a TOF (Time of Flight) sensor that can acquire the distance and the image of the observer P at the same time may be exemplified. In addition, as the detection units 71, a combination of various kinds of ranging sensors such as an infrared sensor and an ultrasonic sensor that detect the distance of the observer P and an imager (camera) that images the observer P may be exemplified. Note that, in the case where the detection unit 71 has an imager, a set of two imagers are used for stereoscopic detection of the observer P.

The processing unit 72 processes the detection results by the respective detection units 71 and transmits them to the display control device 5A. Specifically, in the case where the respective detection units 71 include range image sensors, the processing unit 72 acquires the distances of the observers P detected by the sensors and acquires images imaged by the sensors. Then, the processing unit 72 specifies the positions of the eyes E of the observers P based on the acquired images and the positions of the detection units 71 that have detected the observers P.

On the other hand, in the case where the respective detection units 71 include combinations of the ranging sensors and the imagers, the processing unit acquires the distances of the observers P detected by the ranging sensors and acquires images imaged by the imagers. Then, the processing unit 72 specifies the positions of the observers P based on the acquired images and the positions of the imagers that have imaged the observers P in the same manner as described above.

Note that, when the processing unit 72 specifies the position of the observer P, the processing unit 72 expresses a direction toward the position of the observer P from the center axis C (specifically, the position of the eye of the observer P) by an angle with respect to a previously set reference direction of the directions orthogonal to the center axis C. For example, as shown in FIG. 19, supposing that a direction toward the detection unit 71A from the center axis C is a reference direction D3, the observer P3 is represented to be located in the position at 30 degrees with respect to the reference direction D3, and the observer P4 is represented to be located in a position at 240 degrees with respect to the reference direction D3.

Then, the processing unit 72 transmits observer information containing the acquired distances of the observers P and the positions of the observers P to the display control device 5A. That is, the detection device 7 has a position detection device that detects the positions of the observers P and a distance detection device that detects the distance of the observers P from the center axis C of the screen 2.

Note that, in the embodiment, the processing unit 72 wirelessly transmits the observer information to the display control device 5A. Accordingly, as shown in FIG. 18, even when the detection device 7 and the display control device 5A are provided at the opposite sides to each other in the first direction D1 with the screen 2 in between, the processing unit 72 may transmit the observer information to the display control device 5A without blocking the light projected by the projection devices 3 with a cable or the like.

However, not limited to that, the processing unit 72 may transmit the observer information to the display control device 5A via wire communication. In this case, a cable connecting the processing unit 72 and the display control device 5A may be provided along the inner circumferential surface 2S or outer circumferential surface 2T of the screen 2. The cable is provided on the center axis C, and thereby, the influence on the images projected from the projection devices 3 may be reduced.

On the other hand, the detection device 7 and the display control device 5A (and the memory device 4) may be provided at the same side in the first direction with respect to the screen 2. In this case, the cable is not provided in the optical paths of image lights projected from the respective projection devices 3, and thus, blocking of the image lights by the cable or the like may be reliably prevented.

Images Visually Recognized in response to Distances of Viewpoints

Here, in the above description, the projection devices 3 that project image lights forming visually recognized images VP at viewpoints V in different positions in the second direction D2 are different at the respective viewpoints V. That is, the explanation that the projection devices 3 forming the visually recognized image at the viewpoint V1 and the projection devices 3 forming the visually recognized image at the viewpoint V2 are different is made. In addition, the projection devices 3 forming the visually recognized images at viewpoints located in the same direction from the center axis C at different distances from the center axis C (in other words, at the viewpoints at different distances from the outer circumferential surface 2T) are respectively different and widths of respective partial images in the visually recognized images are also different.

Figure 20:
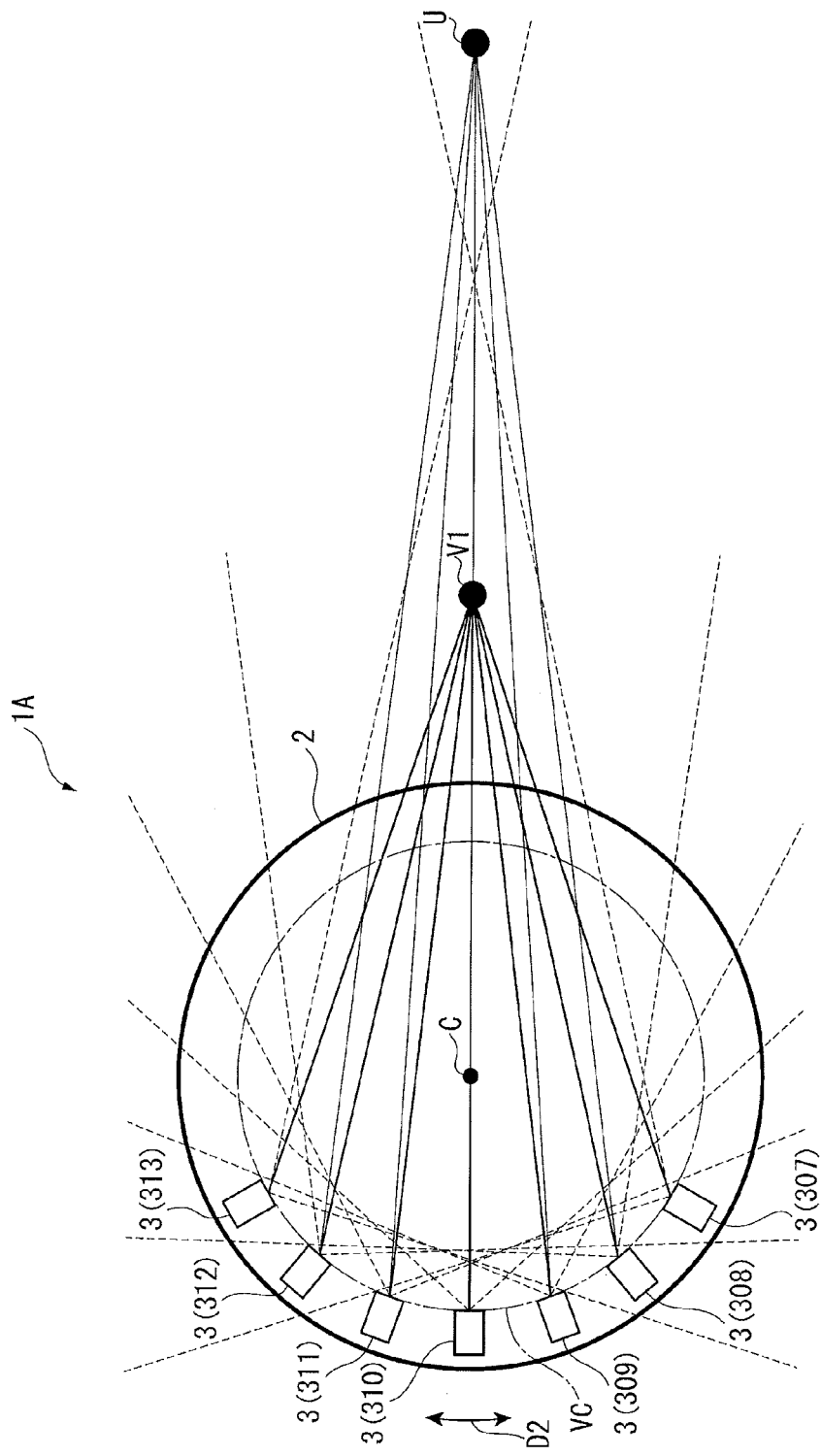
FIG. 20 is a schematic diagram showing trajectories of image lights entering a viewpoint and projection devices that project the image lights in the second embodiment.

FIG. 20 is a schematic diagram showing trajectories of image lights entering a viewpoint U farther from the center axis C in the diameter direction of the screen 2 than the viewpoint V1 and projection devices 3 that project the image lights. Note that, in FIG. 20, illustration of part of the projection devices 3 is omitted.

For example, as shown in FIG. 20, portions of image lights projected from the projection devices 307 to 313 of the projection devices 3 enter the viewpoint V1 apart from the center axis C in a predetermined dimension. Thereby, at the viewpoint V1, as shown in FIG. 7, the visually recognized image VP in which partial images VP1 to VP7 respectively formed by the portions of the image lights are arranged in the second direction is visually recognized.

Figure 21:
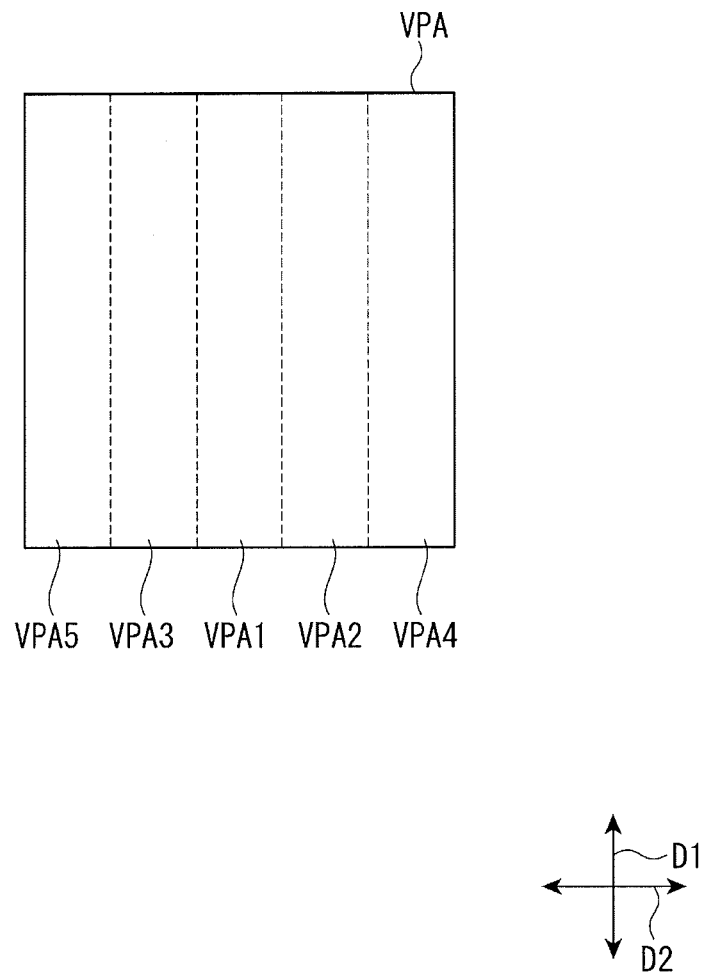
FIG. 21 shows an example of a visually recognized image in the second embodiment.

FIG. 21 shows an example of a visually recognized image VPA visually recognized at the viewpoint U.

However, as shown in FIG. 20, the viewpoint U farther from the center axis C in the diameter direction of the screen 2 than the viewpoint V1 is located within the incident range of the image lights projected by the projection devices 308 to 312, but is located outside of the incident range of the image lights projected by the projection devices 307, 313. Accordingly, the image lights projected from the projection devices 307, 313 do not enter the viewpoint U, but portions of the image lights projected from the projection devices 308 to 312 enter the viewpoint U. Therefore, as shown in FIG. 21, at the viewpoint U, the visually recognized image VPA in which partial images VPA5, VPA3, VPA1, VPA2, VPA4 respectively elongated in the first direction D1 are arranged along the second direction D2 by the portions of the image lights projected from the projection devices 308 to 312 is visually recognized. Note that the dimensions of the partial images VPA1 to VPA5 along the second direction D2 are larger than the dimensions of the partial images VP1 to VP7 in the second direction D2.

Now, the visually recognized image VP (see FIG. 7) visually recognized at the viewpoint V1 contains the partial images VP7, VP6 formed by the projection devices 307, 313, however, the visually recognized image VPA (see FIG. 21) visually recognized at the viewpoint U does not contain the partial images formed by the projection devices 307, 313. Thus, the visually recognized image VPA does not contain the images in both end parts of the visually recognized image VP in the second direction D2.

In this case, an image containing the visually recognized image VP formed by the partial images VP1 to VP7 is projected by the partial images VPA1 to VPA5 visually recognized at the viewpoint U, and thereby, the visually recognized images having the same content may be visually recognized at the viewpoint V1 and the viewpoint U.

Figure 22:
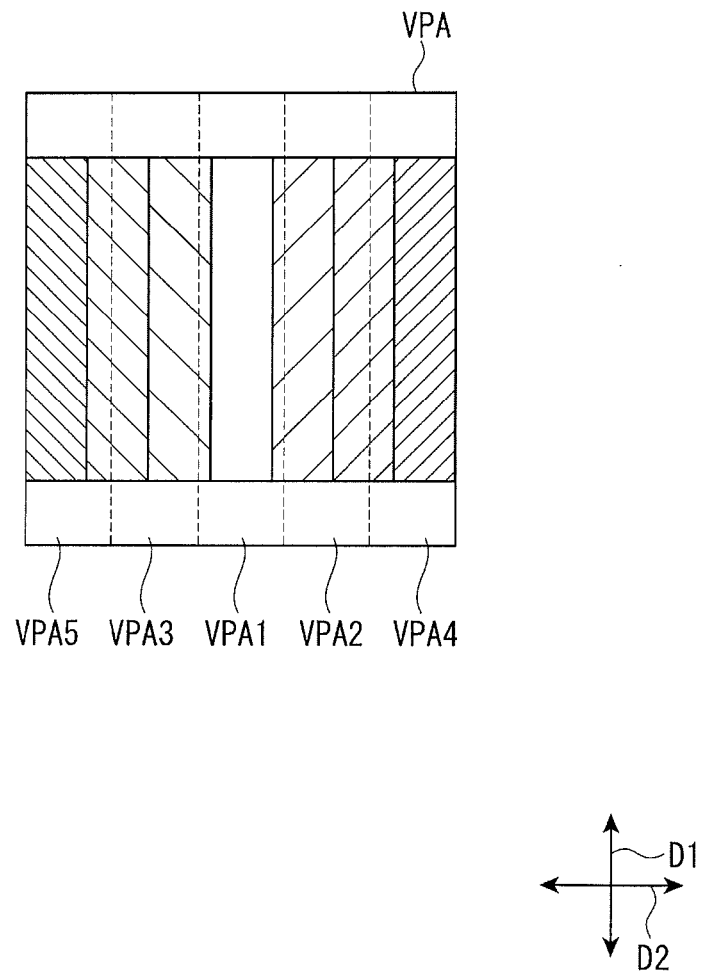
FIG. 22 shows an example of a visually recognized image in the second embodiment.

FIG. 22 shows an example of a visually recognized image VPA as the visually recognized image VP shown in FIG. 7 formed by the partial images VPA1 to VPA5.

For example, as shown in FIG. 22, the projection devices 308 to 312 respectively project the following images as images visually recognized at the viewpoint U. That is, the projection device 308 projects a partial image VPA5 containing the content of the partial image VP7 and one portion of the content of the partial image VP5, and the projection device 309 projects a partial image VPA3 containing the other portion of the content of the partial image VP5 and one portion of the content of the partial image VP3. Further, the projection device 310 projects a partial image VPA1 containing the other portion of the content of the partial image VP3, the content of the partial image VP1, and one portion of the content of the partial image VP2. Furthermore, the projection device 311 projects a partial image VPA2 containing the other portion of the content of the partial image VP2 and one portion of the content of the partial image VP4, and the projection device 312 projects a partial image VPA4 containing the other portion of the content of the partial image VP4 and the content of the partial image VP6.

Thereby, the visually recognized image VPA visually recognized at the viewpoint U contains the visually recognized image VP, and, in the case where the observers P face in the same direction with respect to the screen 2, the same image may be visually recognized by the observers P regardless of the distances from the screen 2 (distances from the center axis C).

Note that, in the example of the visually recognized image VPA in FIG. 22, the images corresponding to the visually recognized image VP are arranged at the center in the first direction D1 and white images are placed on both ends in the first direction D1. However, not limited to that, it is not necessary that the positions of the images corresponding to the visually recognized image VP in the visually recognized image VPA are located at the center, but the positions may be deviated at one side in the first direction D1. Further, not limited to the white images, other images such as black images may be employed.

Configuration of Display Control Device

The display control device 5A controls the respective projection devices 3 like the display control device 5. Specifically, the display control device 5A allows the projection devices 3 that project image lights visually recognized by observers P to project the projected images based on detection results, i.e., detected positions of the observers P, and, on the other hand, restricts the projection of the projected images with respect to the projection devices 3 that project image lights not visually recognized by the observers P. Thereby, power consumption of the display apparatus 1A is reduced.

Further, the display control device 5A forms projected images to be projected by the respective projection devices 3 based on image information stored in the memory device 4 or image information received from the external apparatus.

Specifically, the display control device 5A allows the projection devices 3 that project image lights entering the position of the eye (viewpoint) to project images formed so that the visually recognized image exemplified in FIG. 22 may be visually recognized at the viewpoint based on the position and the distance of the eye of the observer P with respect to the reference direction D3 from the observer information received from the detection device 7. Thereby, the images in response to the respective viewpoints may be projected, and thus, the visually recognized images in response to the directions with respect to the screen 2 may be visually recognized at the respective viewpoints.

Advantages of Second Embodiment

According to the display apparatus 1A of the above described embodiment, the same advantages as those of the display apparatus 1 may be exhibited and the following advantages may be exhibited.

The display apparatus 1A includes the detection device 7 that detects the position of the observer P and the display control device 5A allows the projection devices 3 by which image lights enter the detected position of the observer P of the plurality of projection devices 3 to project the image lights, and restricts image projection by the projection devices 3 by which image lights do not enter the detected position of the observer P. According to the configuration, not all of the projection devices 3 are necessarily required to be operated. Therefore, the power consumption of the display apparatus 1A may be reduced.

The display control device 5A changes the contents of the partial images forming the visually recognized image formed by the respective portions of the projected images by the plurality of projection devices 3 and visually recognized in the position of the observer P in response to the distance of the observer P detected by the detection device 7. For example, when the observer P is located at the viewpoint U farther from the screen 2, the display control device 5A allows the respective projection devices 308 to 312 to project image lights so that the visually recognized image VP at the viewpoint V1 closer to the screen 2 may be formed by the image lights projected by the projection devices 308 to 312 that project image lights entering the viewpoint U and visually recognized. Thereby, the visually recognized image VPA visually recognized at the viewpoint U contains the images corresponding to the visually recognized image VP. Thus, even when the distance of the observer P with respect to the center axis C is changed, the observer P may visually recognize the visually recognized image containing the same content. Therefore, the vision of the image may be made natural.

Modifications of Embodiments

The invention is not limited to the above described embodiments, and the invention includes modifications, improvements, etc. within the range in which the purpose of the invention may be achieved.

In the respective embodiments, the screens 2, 2A have the cylindrical shapes around the center axis C. However, the invention is not limited to that. That is, an arc-shaped screen formed by a part of the cylindrical shape may be employed. In this case, it is necessary to arrange the plurality of projection devices 3 on the virtual circle VC so that images may be projected on the screen.

In the above described embodiments, the display apparatus 1 having the 18 projection devices 301 to 318 is exemplified. However, the invention is not limited to that. That is, the number of projection devices 3 can be appropriately changed based on the diameters of the screens 2, 2A, the diameter of the virtual circle VC on which the respective projection devices 3 are arranged, the diffusion angles of lights of the screens 2, 2A in the second direction, etc. so that the formulae (17) and (18) may be satisfied. On the other hand, in the case where gaps and overlaps between the respective partial images forming the visually recognized images visually recognized at the respective viewpoints are not problematic, the formulae (17) and (18) may not necessarily be satisfied.

In the above described embodiments, regarding the plurality of projection devices 3, the pupil positions of the respective projection optical units 33 are located on the virtual circle VC having the smaller diameter than the screens 2, 2A and the respective projection devices 3 themselves are arranged inside of the screen 2 as seen the direction of the center axis C. However, the invention is not limited to that. That is, the diameter of the virtual circle VC may be larger than the diameters of the screens 2, 2A and at least part of the respective projection devices 3 may be located outside of the screens 2, 2A.

Further, the display apparatuses 1, 1A have configurations in which the respective projection devices 3 directly project image lights on the inner circumferential surface 2S of the screen 2. However, the invention is not limited to that. For example, the respective projection devices 3 may project image lights on the inner circumferential surface 2S via reflection members. In this case, the projection distances of the image lights by the projection devices 3 may be made longer and the images displayed on the screen 2 may be easily enlarged.

In the above described second embodiment, the display control device 5A restricts the image projection by the projection devices 3 by which image lights do not enter the viewpoints at which the eyes of the observers P are located. However, the invention is not limited to that. That is, regardless of the existence of the observers P, the respective projection devices 3 may project image lights. In this regard, the respective projection devices may project image lights forming not the image to be originally projected, but another image.

In the above described second embodiment, the display control device 5A changes the partial images projected by the respective projection devices 3 and visually recognized by the observer P in response to the distance of the observer P from the screen 2 (specifically, the distance of the observer P from the center axis C). However, the invention is not limited to that. For example, the control by the display control device 5A is not necessarily required, and, when the observer P is located in a position farther from a viewpoint previously set in a position apart from the screen 2 (center axis C) in a predetermined dimension, another image may be projected.

In the above described respective embodiments, the projection devices 3 adjacent in the second direction D2 respectively project different color images at the same time. However, the invention is not limited to that. For example, the respective projection devices 3 may project the same color images at the same time or the adjacent projection devices 3 of several devices may project different color images at the same time.

The entire disclosure of Japanese Patent Application No. 2014-120286, filed Jun. 11, 2014 is expressly incorporated by reference herein.

What is claimed is:

1. A display apparatus comprising:
   a transmissive screen formed in an arc shape forming at least a part of a cylindrical shape around a center axis, and, when light entering an inner circumferential surface is output from an outer circumferential surface, having a diffusion angle in a first direction as a direction along the center axis wider than a diffusion angle in a second direction as a circumferential direction around the center axis;
   a plurality of projection devices that are respectively arranged at equal intervals along the second direction around the center axis and respectively project image lights on the inner circumferential surface; and
   a display control device that allows the plurality of projection devices to project the image lights so that partial images formed by portions of the respectively projected image lights of the plurality of projection devices may be visually recognized as one visually recognized image in which the partial images are arranged in the second direction at a plurality of viewpoints set outside of the outer circumferential surface along the second direction.

2. The display apparatus according to claim 1, wherein, when the plurality of projection devices are seen the first direction, respective output parts of the image lights are located inside of the cylindrical shape.

3. The display apparatus according to claim 1, wherein the screen has a direction adjustment layer that adjusts a traveling direction of the light output from the outer circumferential surface when the light entering the inner circumferential surface is output from the outer circumferential surface.

4. The display apparatus according to claim 1, further comprising a position detection device that detects a position of an observer,
   wherein the display control device allows the projection devices that project the image lights entering the detected position of the observer in the plurality of projection devices to project the image lights.

5. The display apparatus according to claim 1, further comprising a distance detection device that detects a distance of an observer from the center axis,
   wherein the display control device forms the partial images making the visually recognized image visually recognized in the position of the observer in response to the detected distance of the observer.

6. The display apparatus according to claim 1, wherein, supposing that a number of the plurality of projection devices is n, a diameter of the screen is D, and a diameter of a virtual circle on which respective pupil positions of the plurality of projection devices are located around the center axis is φ, a diffusion angle δ of the screen in the second direction is expressed by formula (1):

$$\delta = 360/n \times 1/(D/\phi + 1) \qquad (1).$$

7. The display apparatus according to claim 1, wherein each of the plurality of projection devices includes:
   a light source unit that respectively and individually outputs three color lights of red, green, and blue in a time-division manner;
   a light modulator that respectively modulates the three color lights output from the light source unit and forms color images in response to the three color lights; and
   a projection optical unit that projects the color images in response to the three color lights formed by the light modulator,
   wherein the display control device allows the adjacent projection devices of the plurality of projection devices to respectively project the color images in different colors.

* * * * *